(12) United States Patent
Wattles et al.

(10) Patent No.: US 6,826,989 B1
(45) Date of Patent: Dec. 7, 2004

(54) APPARATUS AND METHOD FOR PORTIONING AND AUTOMATICALLY OFF-LOADING WORKPIECES

(75) Inventors: Darren P. Wattles, Renton, WA (US); Craig E. Pfarr, Issaquah, WA (US); Carlos A. Ordona, Mukilteo, WA (US); Norman A. Rudy, Snohomish, WA (US)

(73) Assignee: FMC, Chicago, IL (US)

( * ) Notice: Subject to any disclaimer, the term of this patent is extended or adjusted under 35 U.S.C. 154(b) by 0 days.

(21) Appl. No.: 09/619,423

(22) Filed: Jul. 19, 2000

(51) Int. Cl.[7] .................................................. B26D 7/32
(52) U.S. Cl. .......................... 83/102; 83/152; 83/177; 83/932
(58) Field of Search ................................ 83/177, 152, 100, 83/102, 932

(56) References Cited

U.S. PATENT DOCUMENTS

| | | |
|---|---|---|
| 3,906,823 A | 9/1975 | Spooner |
| 4,065,911 A | 1/1978 | Fagan |
| 4,238,718 A | 12/1980 | Wepner et al. |
| 4,249,438 A * | 2/1981 | Kelley ........................ 83/177 X |
| 4,351,518 A | 9/1982 | Stievenart |
| 4,372,099 A | 2/1983 | Linville |
| 4,509,638 A | 4/1985 | Kato et al. |
| 4,548,107 A | 10/1985 | Marchese et al. |
| 4,557,019 A | 12/1985 | Van Devanter et al. |
| 4,580,475 A | 4/1986 | Antonissen |
| 4,603,610 A | 8/1986 | Whitehouse |
| 4,627,007 A | 12/1986 | Muschany |
| 4,794,996 A | 1/1989 | Wallace et al. |
| 4,868,951 A | 9/1989 | Akesson et al. |
| 4,875,254 A | 10/1989 | Rudy et al. |
| 4,913,044 A * | 4/1990 | Heath ........................ 83/177 X |
| 4,941,375 A | 7/1990 | Kasper |
| 4,941,379 A * | 7/1990 | Gasbarro ................... 83/177 X |
| 4,962,568 A | 10/1990 | Rudy et al. |
| 5,031,496 A * | 7/1991 | Lobash et al. ............. 83/177 X |
| 5,042,340 A | 8/1991 | Kasper |
| RE33,851 E | 3/1992 | Rudy et al. |
| RE33,904 E | 4/1992 | Rudy et al. |
| 5,155,981 A * | 10/1992 | Tordini ...................... 83/152 X |
| 5,205,367 A | 4/1993 | Andre et al. |
| 5,243,886 A * | 9/1993 | Rudy et al. ............... 83/177 X |
| 5,365,816 A | 11/1994 | Rudy |
| 5,429,022 A * | 7/1995 | Nakayama ................. 83/152 X |
| 5,450,333 A | 9/1995 | Minami et al. |
| 5,463,921 A * | 11/1995 | Bellio et al. ............... 83/152 X |
| 5,499,719 A | 3/1996 | Lindee et al. |
| 5,724,874 A | 3/1998 | Lindee et al. |
| 5,829,332 A * | 11/1998 | Dieterlen .................... 83/152 X |
| 5,868,056 A | 2/1999 | Pfarr et al. |
| 5,921,375 A | 7/1999 | van Laar |
| 5,937,080 A | 8/1999 | Vogeley, Jr. et al. |
| 6,055,895 A * | 5/2000 | Kanazawa ................. 83/152 X |
| 6,101,912 A * | 8/2000 | Sanders et al. ........... 83/177 X |
| 6,129,625 A | 10/2000 | Cate et al. |
| 6,164,174 A | 12/2000 | Sigurdsson et al. |

FOREIGN PATENT DOCUMENTS

| | | |
|---|---|---|
| EP | 0 348 311 A1 | 12/1989 |
| EP | 0 819 381 A1 | 1/1998 |
| FR | 2 713 535 A1 | 6/1995 |

* cited by examiner

Primary Examiner—Charles Goodman
(74) Attorney, Agent, or Firm—Christensen O'Connor Johnson Kindness PLLC

(57) ABSTRACT

A conveyor (22) moves workpieces (WP) past a scanning station (40) to ascertain one or more physical parameters of the workpiece (WP) and to a portioning station (24) wherein the workpiece (WP) is portioned into desired smaller portions. Thereafter, the conveyor (22) carries a portioned workpiece (WP) to an unloading station (26) where one or more pickup devices (28) removes specific portioned workpieces (PP) from the conveyor and places the portioned workpieces onto take away conveyors (30) for other locations remote from the first conveyor. A control system, composed in part of a computer (42), keeps track of the locations of the workpieces (WP) on the conveyor (22) and also optionally on the take away conveyor (30) so that portioned pieces (PP) are placed at specific desired locations remote from the conveyor (22) by the pickup devices (28).

5 Claims, 15 Drawing Sheets

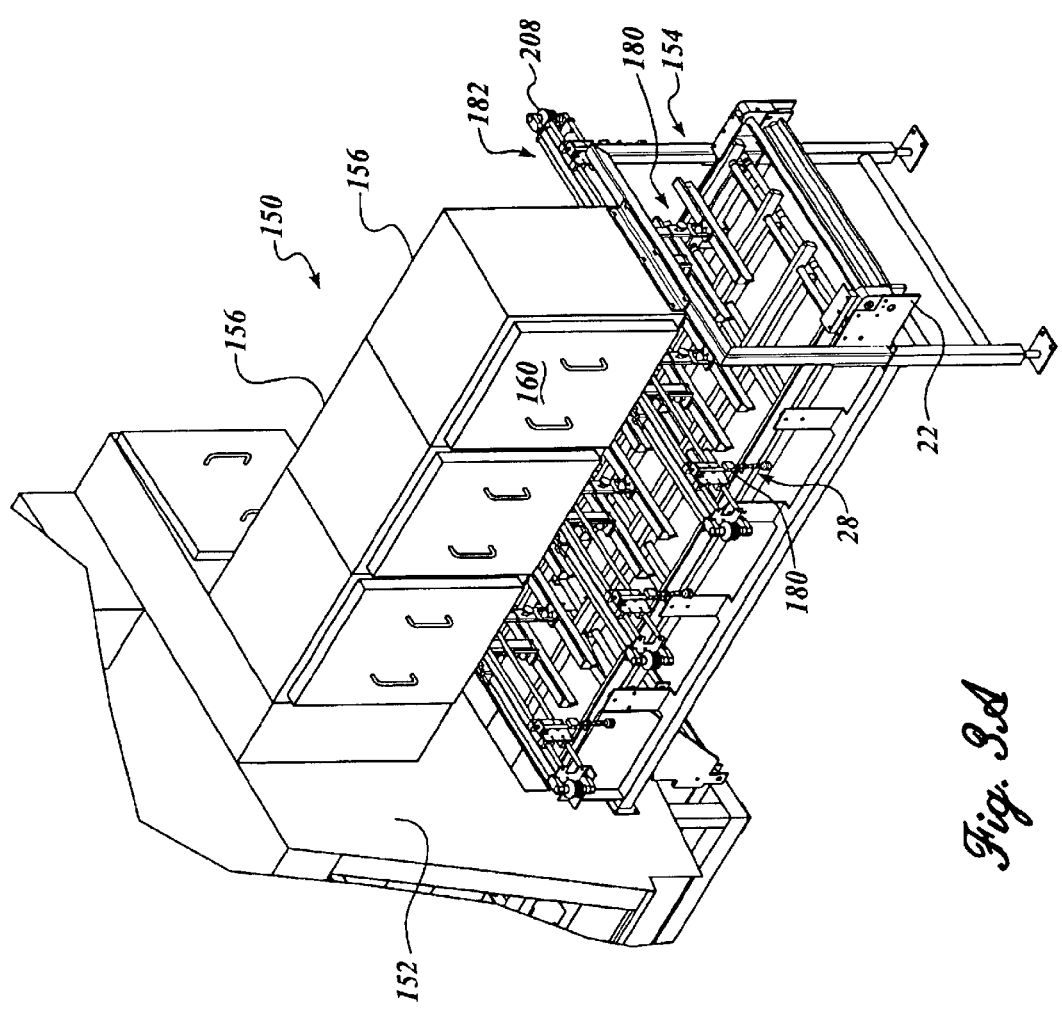

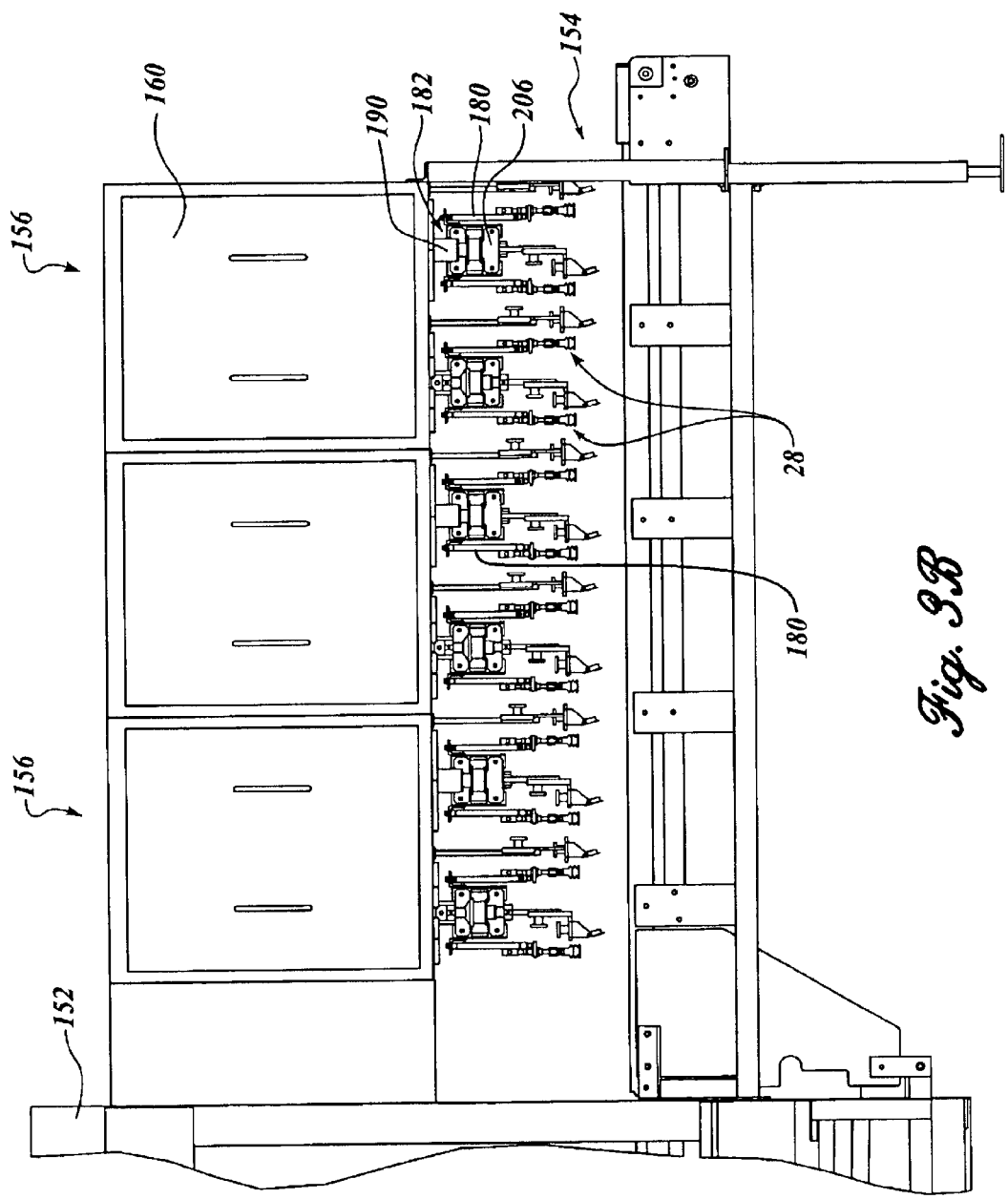

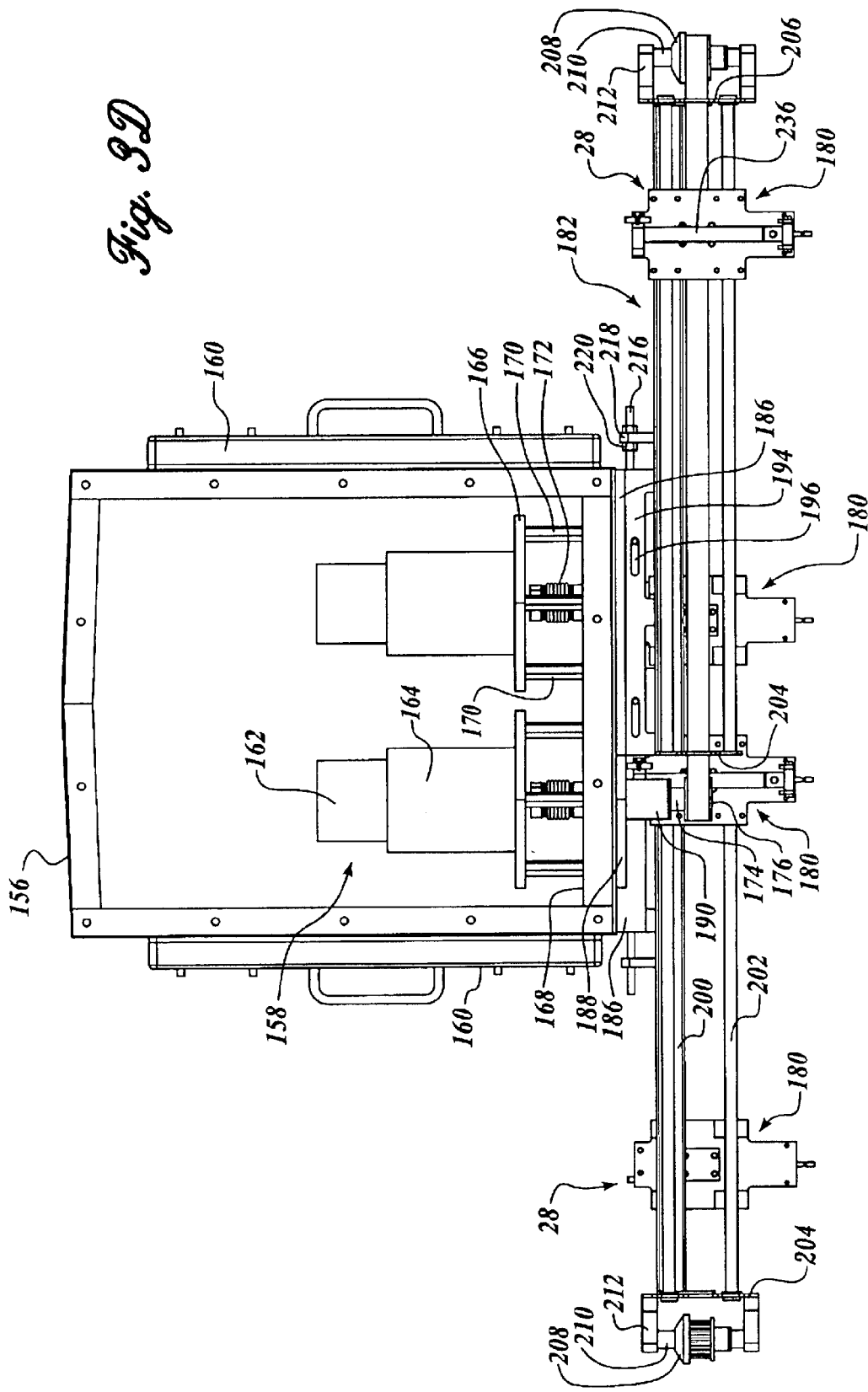

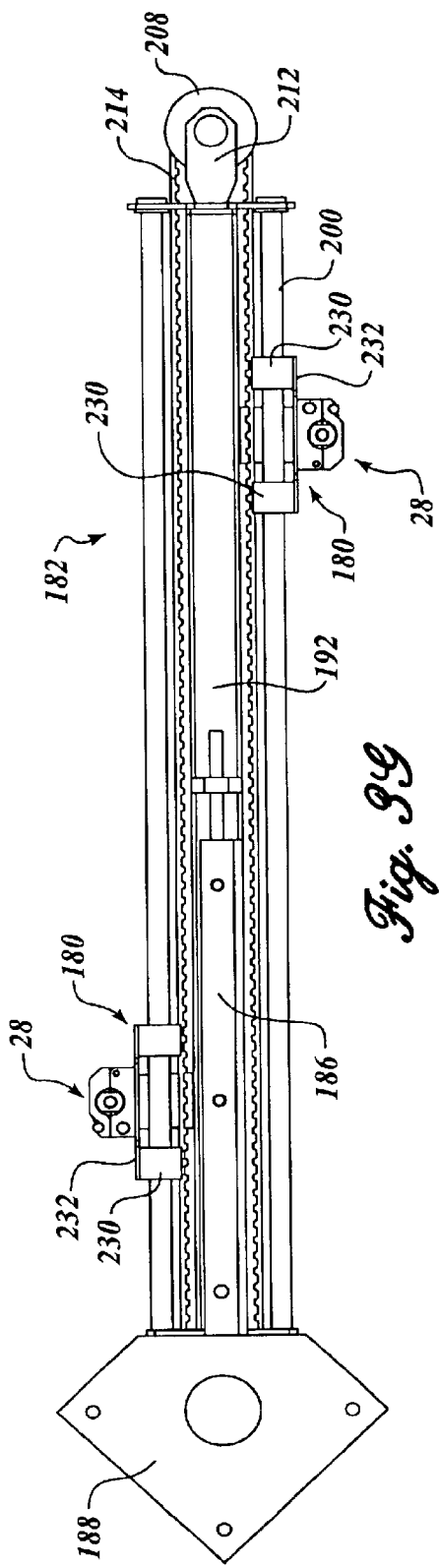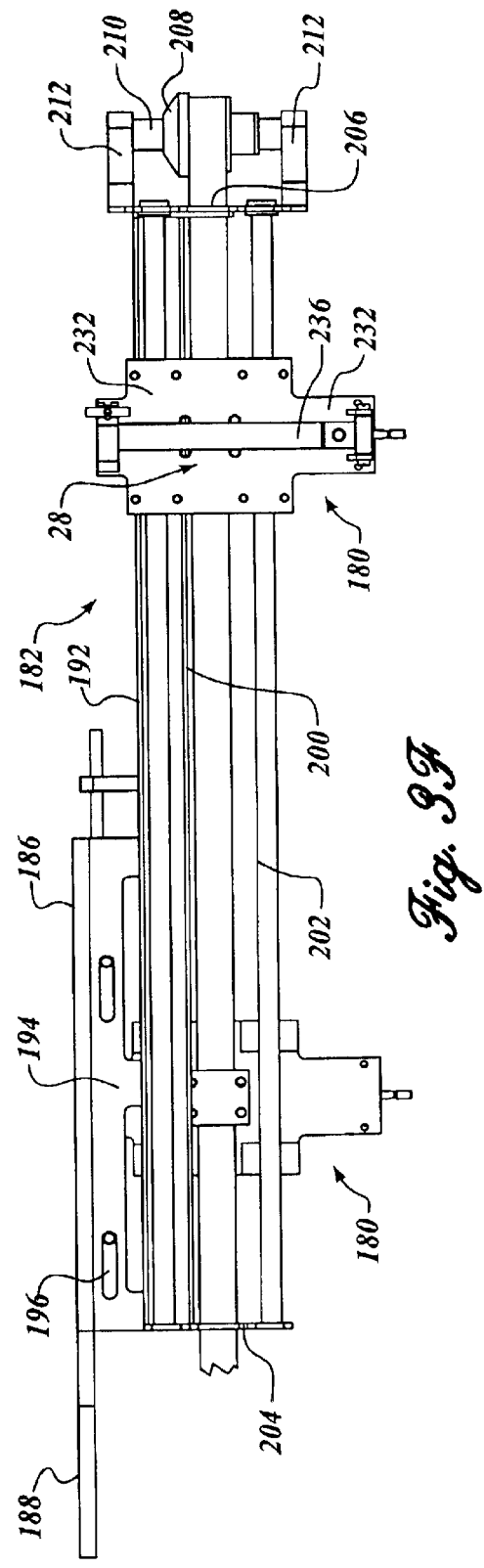

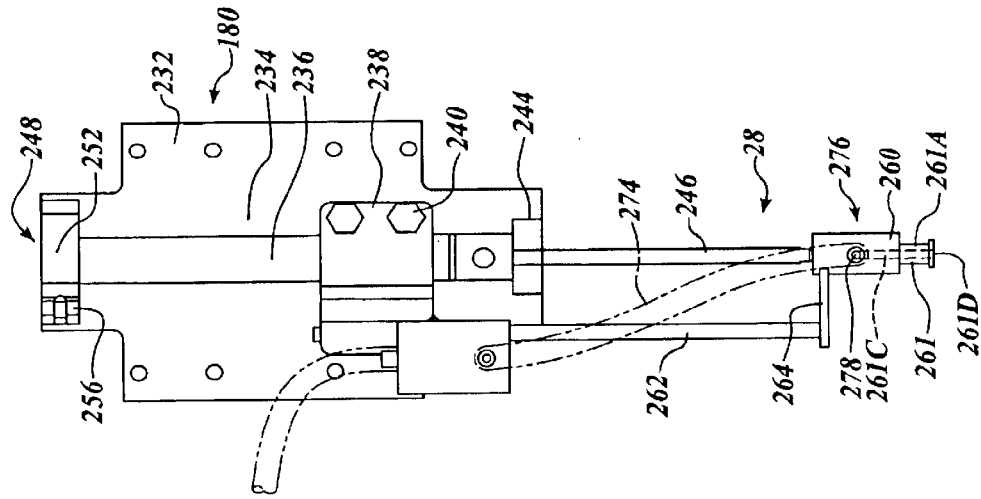
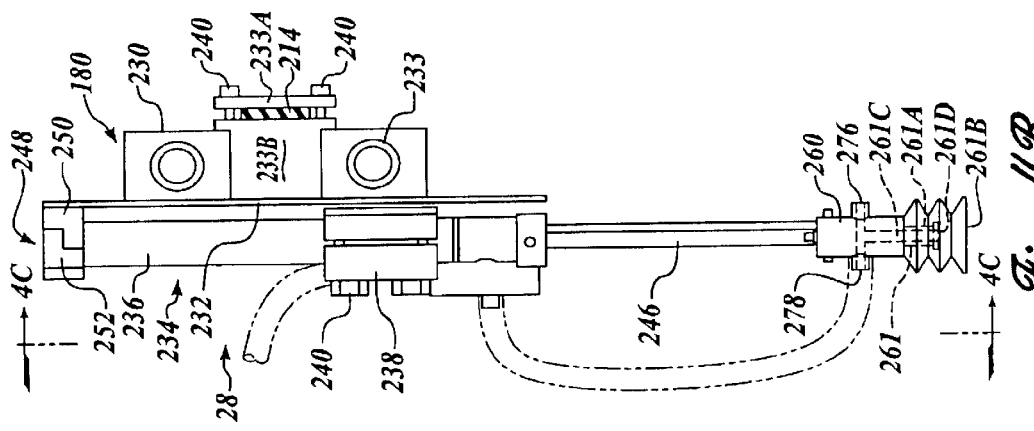
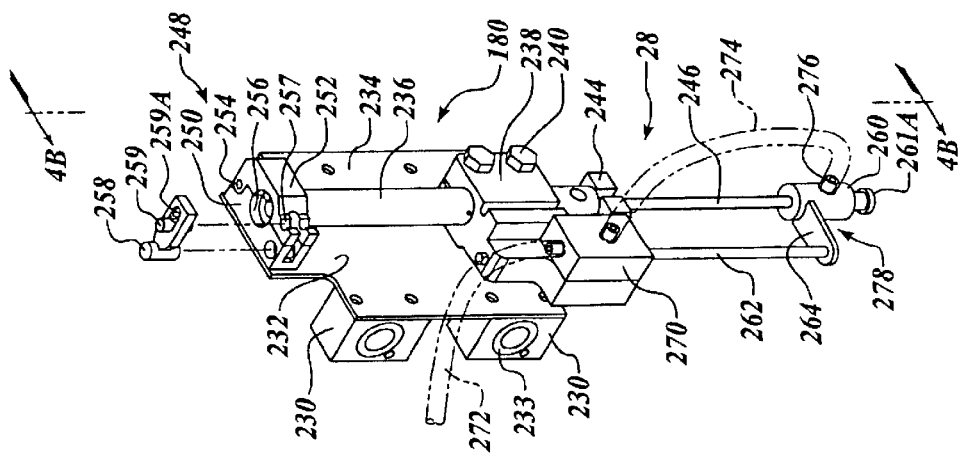

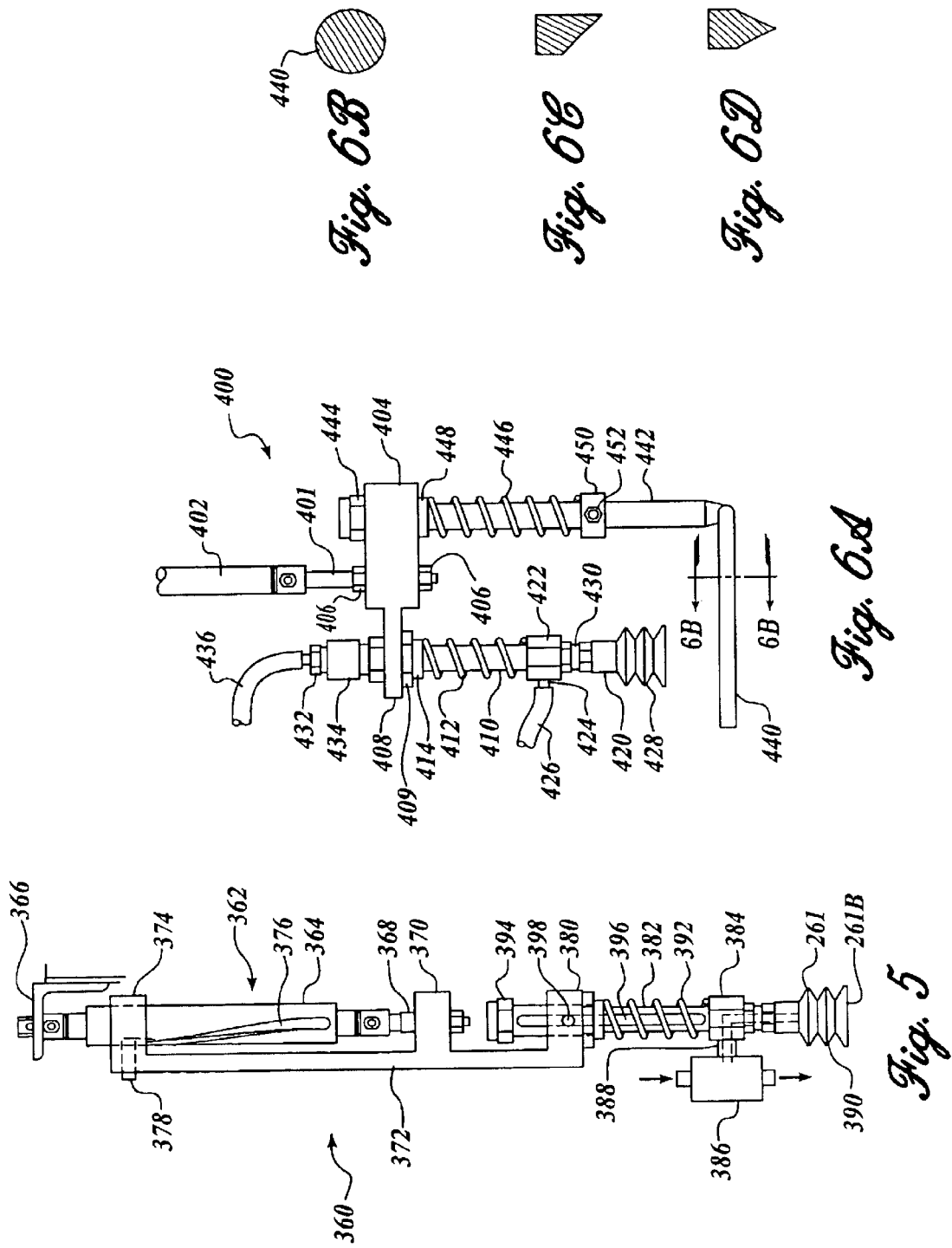

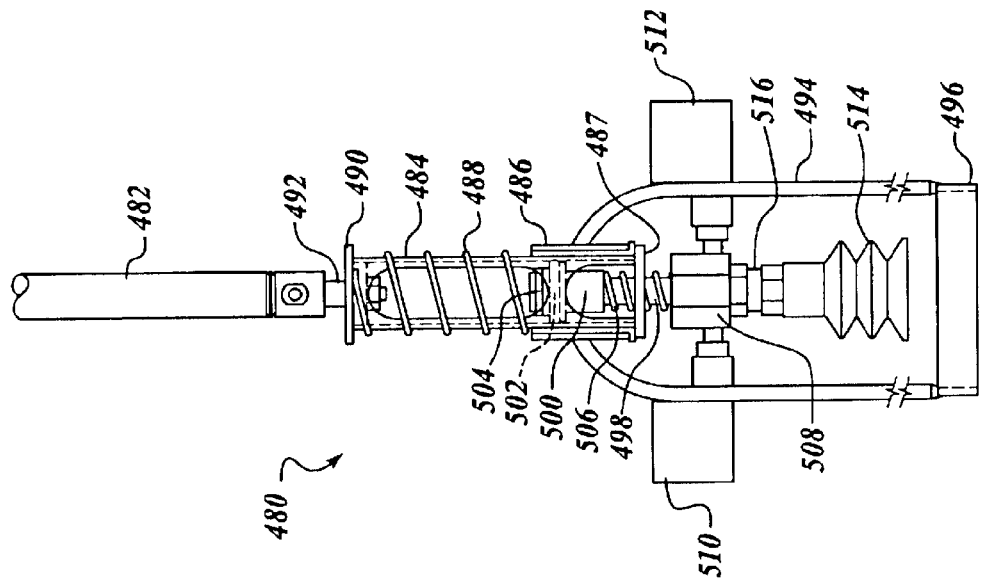
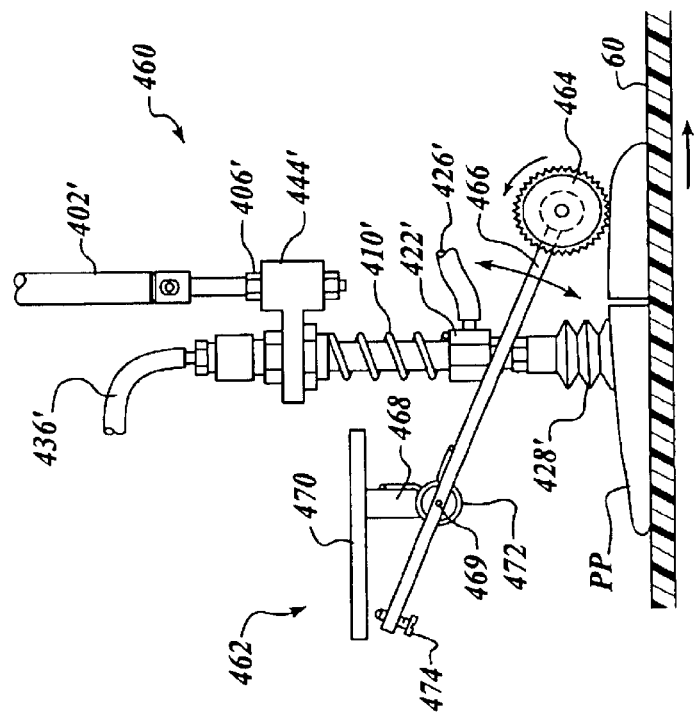

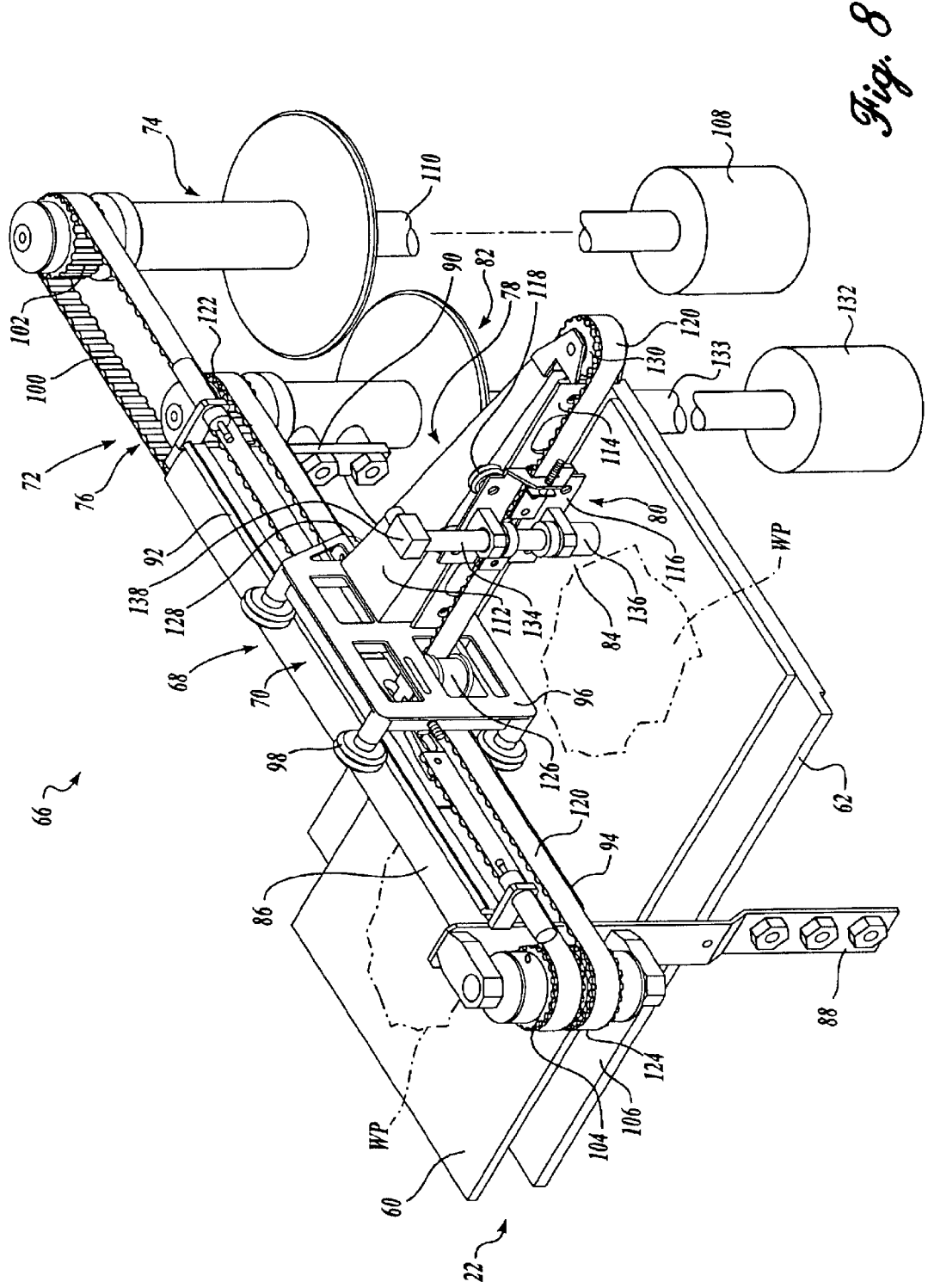

APPARATUS AND METHOD FOR PORTIONING AND AUTOMATICALLY OFF-LOADING WORKPIECES

FIELD OF THE INVENTION

The present invention relates generally to an apparatus for portioning and/or trimming workpieces, and more particularly to an apparatus for portioning or trimming workpieces by shape, weight, or other physical parameter and then automatically off-loading the portioned workpieces.

BACKGROUND OF THE INVENTION

Workpieces, including food products, are cut or otherwise portioned into smaller portions by processors in accordance with customer needs. Also, excess fat, bone, and other foreign or undesired materials are routinely trimmed from food products. It is usually highly desirable to portion and/or trim the workpieces into uniform sizes, for example, for steaks to be served at restaurants or chicken fillets used in frozen dinners or in chicken burgers. Much of the portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into optimum sizes. For example, a customer may desire chicken breast portions in two different weight sizes, but with no fat or with a limited amount of acceptable fat. The chicken breast is scanned as it moves on a conveyor belt and a determination is made through the use of a computer as to how best to portion the chicken breast to the weights desired by the customer, so as to use the chicken breast most effectively.

Portioning and/or trimming of the workpiece can be carried out by various cutting devices, including high-speed water jet cutters or rotary or reciprocating blades, as the food product continues to travel on the conveyor. Once the portioning/trimming has occurred, the resulting portions are off-loaded from the conveyor by hand to be placed on a second take-away conveyor for further processing or, perhaps, to be placed in a storage bin. The manual off-loading of portioned pieces is often unsatisfactory because it is difficult for the worker to visually distinguish between portions that might vary by only a few ounces. As a result, the portioned piece may be placed onto the wrong conveyor or into the wrong storage bin. Also, the portioning of food products, especially fish, poultry or meat, typically occurs at relatively low temperatures, in the range of 40 degrees. Performing the same repetitive off-loading tasks in this cold environment can lead to physical ailments as well as creating an undesirable work environment. As such, relatively high worker turnover is not uncommon.

The present invention is directed at automatically portioning workpieces, including food products, and then automatically off-loading the portioned workpieces for further processing, for storage, etc. In addition, the present invention is capable of recognizing which particular portioned piece is being off-loaded so that portioned pieces of like weight, shape, or other physical parameter are routed to the proper off-loading conveyor, storage bin, etc.

SUMMARY OF THE INVENTION

The present invention includes a system for automatically portioning and/or trimming workpieces to desired reduced sizes and then automatically removing the portioned workpieces for routing to other locations based on the size, weight, or other physical parameter of the portioned workpiece. The system includes a first conveyor having a moving support service adapted to support and advance a workpiece to be portioned. The workpiece is cut/trimmed into one or more desired reduced size portions at a cutting station. Thereafter, a pickup device picks up the workpiece from the first conveyor to carry the portioned workpiece to locations removed from the first conveyor. A control subsystem tracks the locations on the moving support surface of the workpiece portions before and after portioning and directs the pickup device to pick up a desired workpiece portion and carry such desired workpiece portion to a specific remote location based on a physical parameter or other attribute of the portioned workpiece. In this manner, like portioned workpieces are removed to the same location remote from the first conveyor.

In a further aspect of the present invention, the pickup device includes an attachment end portion that is attachable to the portioned workpiece. In addition, the pickup devices are supported for movement relative to the first conveyor to carry the portioned workpieces away from the first conveyor to a location remote from the first conveyor.

In a further aspect of the present invention, the attachment end portion of the pickup device adheres to the portioned workpiece by suction.

In another aspect of the present invention, the attachment end portion of the pickup device includes a suction tip or head, and a suction source is connected to the suction tip to cause the suction tip to adhere to the workpiece.

In an additional aspect of the present invention, the suction source is produced by a venturi in air flow communication with the suction tip. Pressurized air is supplied to the venturi, causing the venturi to generate a reduced pressure air source.

In a further aspect of the present invention, the suction tip is downwardly extendible for attachment to a workpiece and then upwardly retractable to lift the workpiece off of the conveyor and carry the workpiece to a location remote from the conveyor.

In another aspect of the present invention, the pickup device is mounted on the carriage for supporting and guiding the pickup device for movement relative to the conveyor.

In a further aspect, the present invention includes an impingement or restraining device which is located relative to the pickup device for restraining the upward movement of sections of the workpiece that do not comprise the portioned workpiece to be picked up by the pickup device.

In another aspect of the present invention, the weight, size, or other desired physical parameter(s) of the portioned workpiece is ascertained or measured downstream of the pickup device, and based on such information, the portioning subsystem may be recalibrated so as to produce portions of the desired size or other physical parameter.

In accordance with an additional aspect of the present invention, the portioning/trimming of the workpieces is carried out utilizing high speed water jets as cutters.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3A is a perspective view of the off loader station of the present invention;

FIG. 3B is an elevational view of FIG. 3A;

FIG. 3C is an end elevational view of FIG. 3A;

FIG. 3D is an enlarged, fragmentary end view similar to FIG. 3C, specifically illustrating the support structure and drive system for carriages used to move pickup devices of the present invention;

FIG. 3F is an enlarged, fragmentary view of a portion of FIG. 3D, specifically illustrating the carriage support structure;

FIG. 3G is a plan view of FIG. 3F;

FIG. 4A is an isometric view of a pickup device of the present invention;

FIG. 4B is a side elevational view of FIG. 4A taken along lines 4B—4B;

FIG. 4C is a front elevational view of FIG. 4A taken along lines 4C—4C of FIG. 4B;

FIG. 4F is a fragmentary isometric view showing the pickup device, the skirt and hold-down devices;

FIG. 5 is an elevational view of an alternative pickup device;

FIG. 6A is an elevational view of a further preferred hold down device of the present invention;

FIG. 6B is a cross-sectional view of a portion of 6A taken along lines 6B—6B thereof;

FIGS. 6C and 6D are alternative cross-sectional views corresponding to FIG. 6B;

FIG. 6E is another preferred embodiment of a pickup device according to the present invention;

FIG. 7 is a further preferred embodiment of a pickup device in accordance with the present invention; and FIG. 8 is a schematic view of a high speed water jet nozzle and a carriage therefor used in the portioning station shown in FIG. 1.

DETAILED DESCRIPTION OF THE PREFERRED EMBODIMENTS

Figure 1:
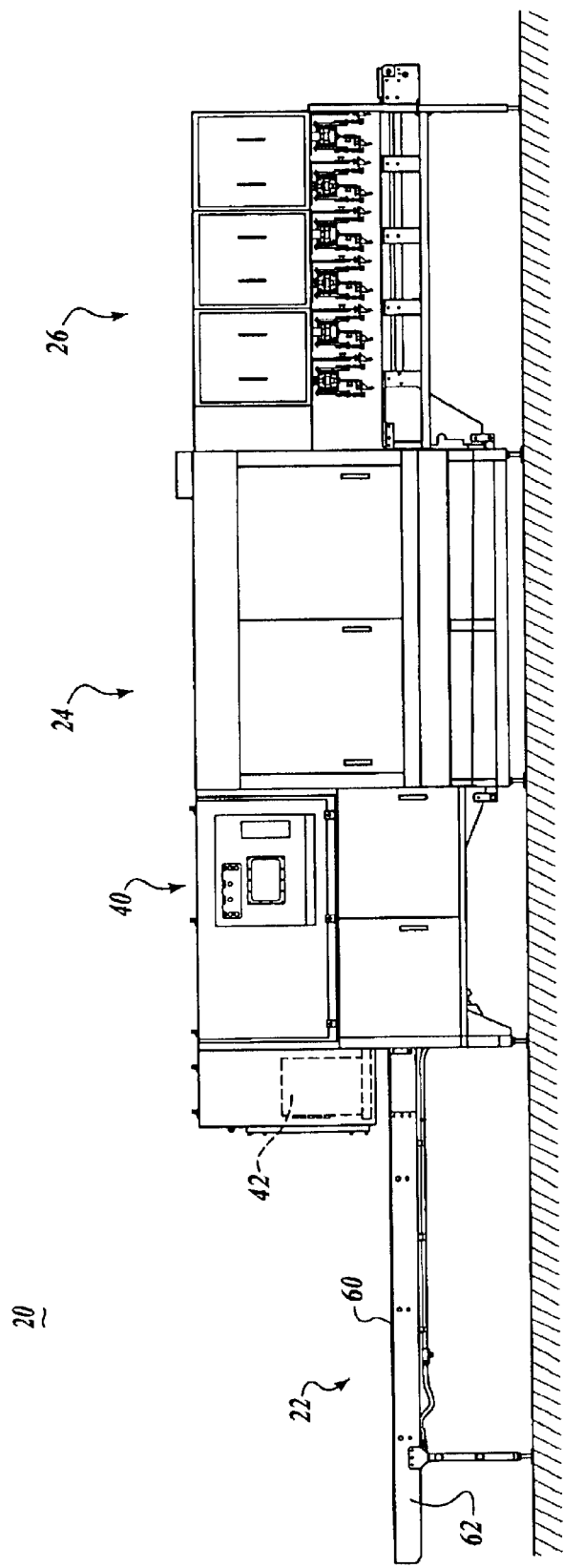
FIG. 1 is a side elevational view of a portioning machine utilized in the present invention.
Figure 2A:
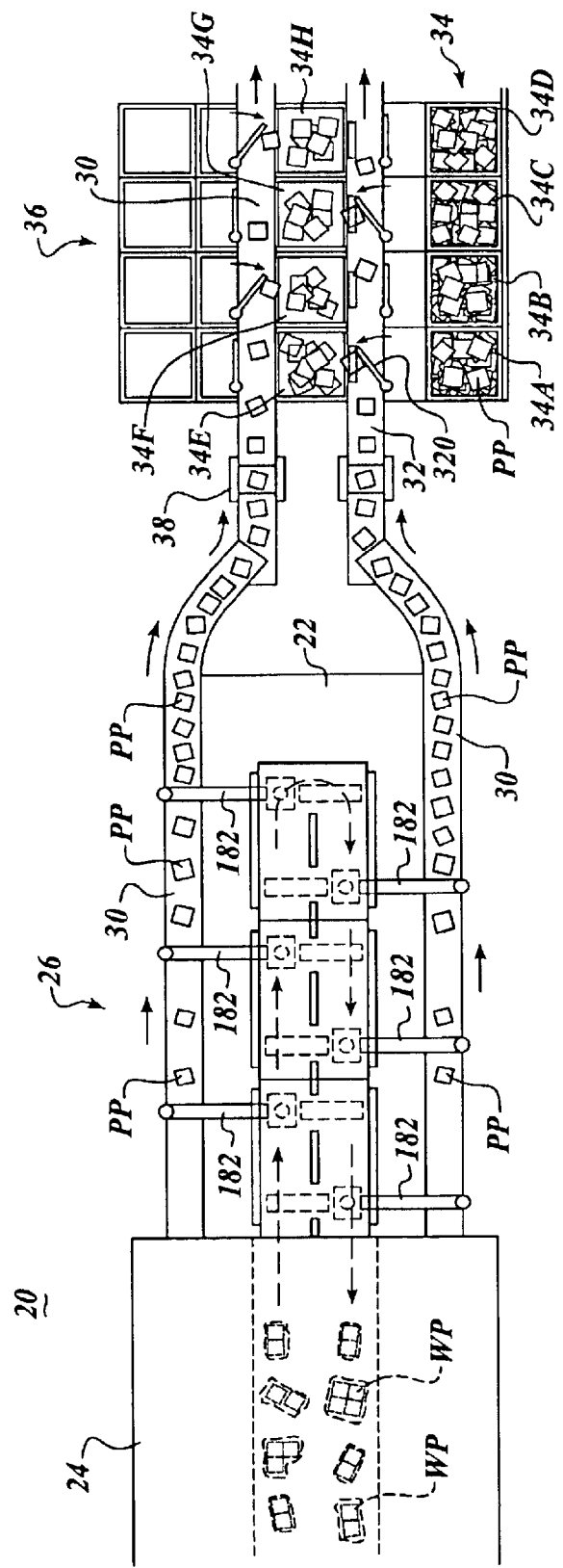
FIG. 2A is a schematic plan view of the manner in which portioned workpieces are off loaded from the portioning machine based on physical characteristics of the portioned workpiece.
Figure 2B:
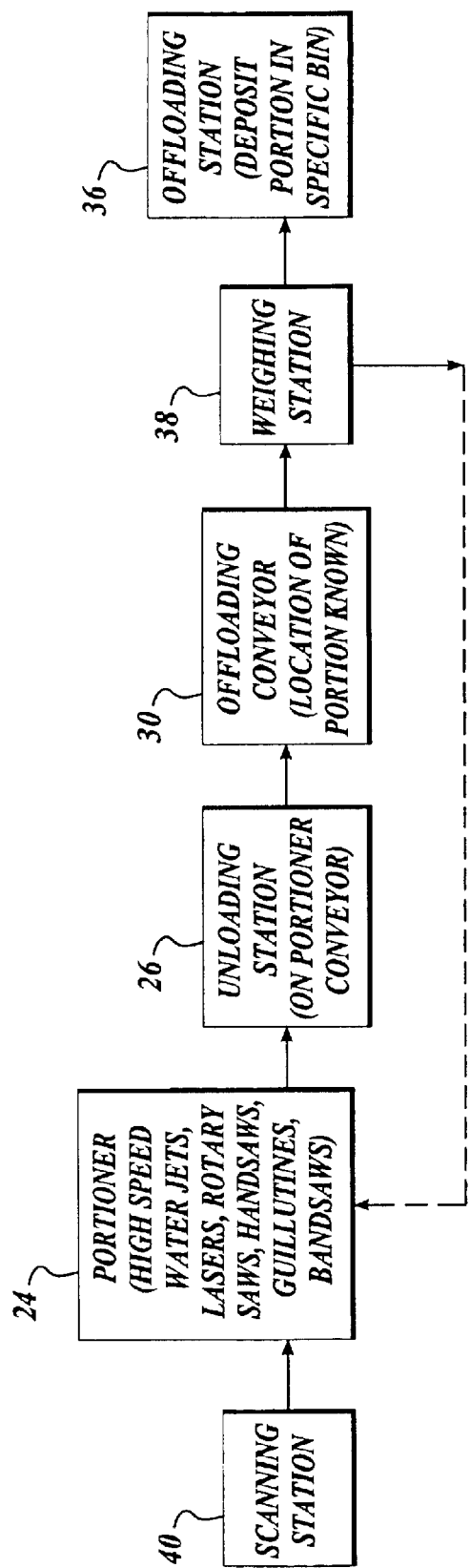
FIG. 2B is a block diagram of the overall process of the present invention.
Figure 9C:
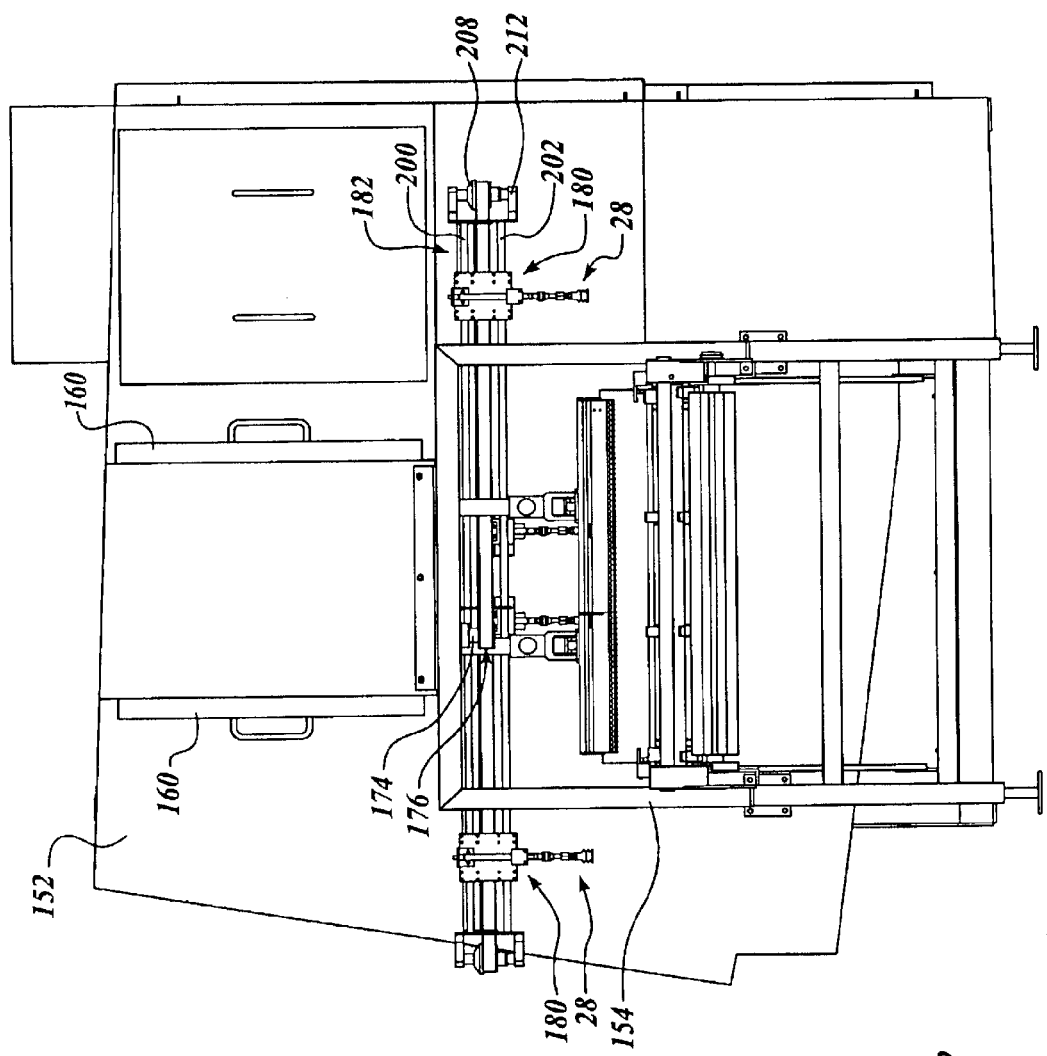
Figure 3E:
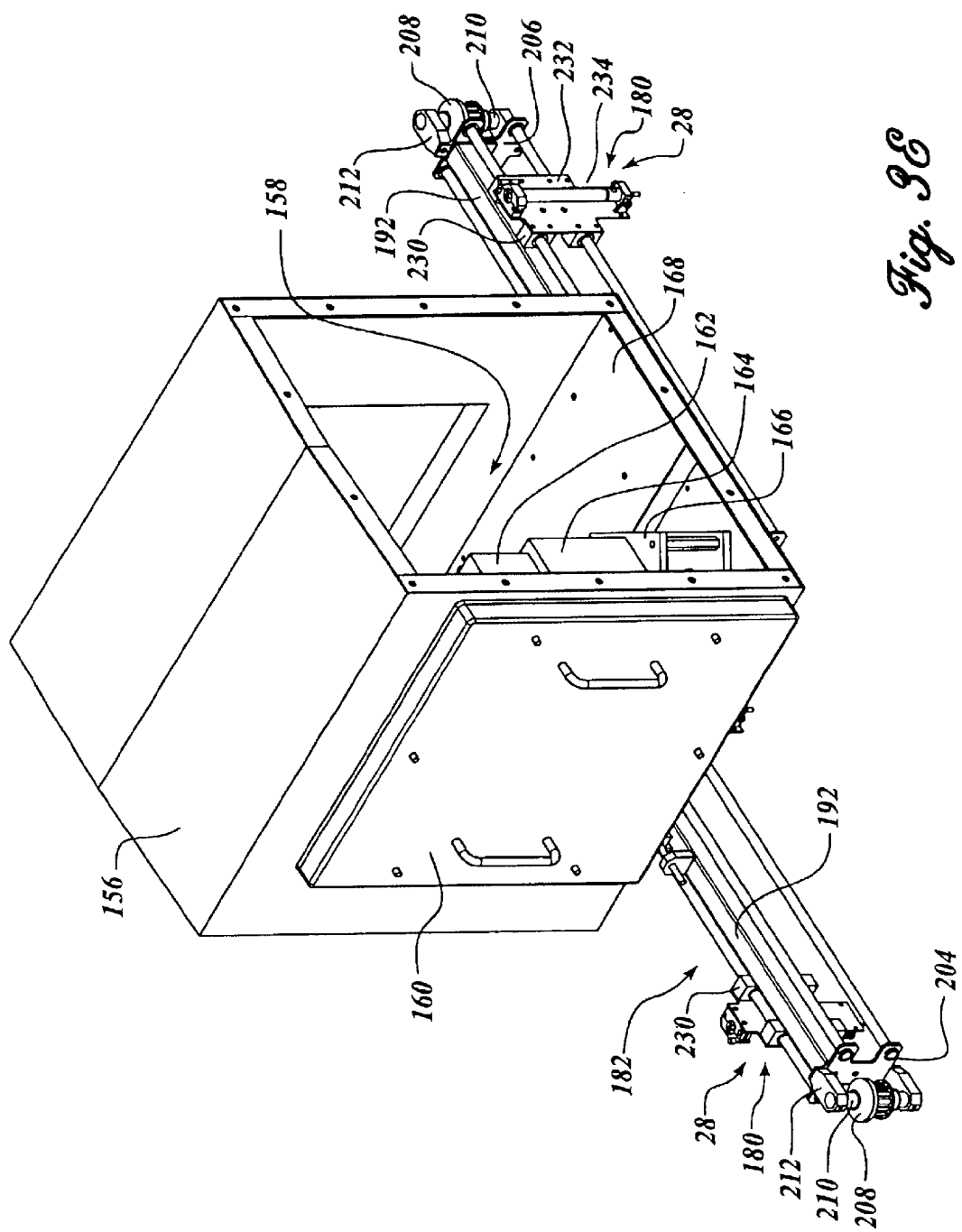
FIG. 3E is an isometric view of FIG. 3D.

Referring initially to FIGS. 1, 2A, and 2B in general terms, the present invention includes a portioning apparatus 20 having a moving conveyor 22 for supporting workpieces WP to be portioned at a portioning station 24 and to carry the portioned pieces PP to an unloading station 26. A plurality of pickup devices 28 pick up the portioned pieces PP off the conveyor 22 at the unloading station 26 and place the portioned pieces onto removal or take-away conveyors 30 moving outwardly alongside the conveyor 22. The removal conveyors 30 deposit the portioned pieces PP onto sorting conveyors 32 from which the portioned pieces are placed into specific receiving bins or hoppers 34A, 34B, 34C, 34D, 34E, 34F, 34G, and 34H at a sorting station 36. A weighing station 38 may be incorporated into sorting conveyor 32 to verify the weight of the portioned piece PP. This information can be utilized by the sorting station 36 so that the correct portion piece is removed to the correct sorting/receiving bin 34. This information may also be utilized by the portioning apparatus 20 to make adjustments so that the portioned pieces are of the desired size.

Also in accordance with the present invention, the portioning apparatus retains or keeps track of the location of each workpiece WP on the conveyor 22, and the subsequent locations of the portioned pieces PP on the conveyor 22 downstream of the portioning station 24 as well as the locations of the portioned pieces on the removal conveyors 30. With this information, the proper portioned pieces can be automatically placed in the desired receiving bins 34 at the sorting station 36, without human intervention.

Next, describing the present invention in more detail, portioning machines similar to apparatus 20 are known in the art, with the exception of the unloading station 26, which is novel to the present invention. Such portioning machines, or portions thereof, are disclosed in prior patents, for example, U.S. Pat. Nos. 4,962,568 and 5,868,056, which are incorporated by reference herein. As is typical, the portioning machine includes a conveyor 22 spanning the entire length of the apparatus 20, with the conveyor having a moving belt 60 that slides over a support structure 62 constructed in a standard manner. The conveyor belt 60 is driven at a selected speed by a drive motor (not shown) in a standard manner. The drive motor can be composed of a variable speed motor to thus adjust the speed of the belt 60. The workpieces WP are carried on the conveyor belt 60 to be operated on by the portioning apparatus 20 and then transported to the sorting station 36.

The workpieces WP are first carried by the conveyor 22 to a scanning station 40 whereat the workpieces are scanned to ascertain selected physical parameters, for example, their size and shape, and then determine their weight, typically by utilizing an assumed density for the workpieces. In addition, it is possible to locate discontinuities (including voids), foreign material, and undesirable material in the workpiece, for example, bones or fat in a meat portion.

The scanning can be carried out utilizing a variety of techniques, including a video camera to view a workpiece illuminated by one or more light sources. Light from the light source is extended across the moving conveyor belt 60 to define a sharp shadow or light stripe line, with the area forwardly of the transverse beam being dark. When no workpiece is being carried by the conveyor, the shadow line/light stripe forms a straight line across the conveyor belt. However, when a workpiece passes across the shadow line/light stripe, the upper, irregular surface of the workpiece produces an irregular shadow line/light stripe as viewed by a video camera directed downwardly on the workpiece and the shadow line/light stripe. The video camera detects the displacement of the shadow line/light stripe from the position it would occupy if no workpiece were present on the conveyor belt. This displacement represents the thickness of the workpiece along the shadow line/light stripe. The length of the workpiece is determined by the length of time that shadow lines are created by the workpiece. In this regard, an encoder is integrated into the conveyor 22, with the encoder generating pulses at fixed time intervals corresponding to the forward movement of the conveyor.

In lieu of a video camera, the scanning station 40 may instead utilize an x-ray apparatus for determining the physical characteristics of the workpiece, including its shape, mass and weight. X-rays may be passed through the object in the direction of an x-ray detector. Such x-rays are attenuated by the workpiece in proportion to the mass thereof. The x-ray detector is capable of measuring the intensity the x-rays received thereby after passing through the workpiece. This information is utilized to determine the overall shape and size of the workpiece, as well as the mass thereof. An example of such an x-ray scanning device is disclosed by U.S. Pat. No. 5,585,603, incorporated by reference herein.

The data information measured/gathered by the scanning devices is transmitted to a computer 42, preferably on board the portioning apparatus 20, which records the location of the workpiece on the conveyor as well as the shape and other parameters of the workpiece. With this information, the computer determines how to optimally cut or portion the workpiece at the portioning station 24, the portioning may be carried out by various types of cutting/portioning devices including high-pressure water jets as disclosed in U.S. Pat. Nos. 4,875,254; 5,365,186 and 5,868,056. Other types of cutting devices may be utilized, including band saws, reciprocating saws, circular saws, guillotine knives, and lasers. Workpieces can be portioned in accordance with desired portion sizes, maximum fat content or thickness and other parameters.

FIG. 8 illustrates one particular portioning apparatus 66 located at station 24 that may be utilized in conjunction with the present invention. The portion apparatus 66 in basic form includes a support structure 68 extending across the conveyor 22 for supporting and guiding a carriage 70 for movement transversely to the direction of movement of the conveyor. The carriage 70 is powered by a drive system 72 including in part, a motive system 74 and a drive train 76. A second, longitudinal support structure 78 is cantilevered outwardly from carriage 70 in a direction generally aligned with a direction of movement of the conveyor 22. A second longitudinal carriage 80 is adapted to move along longitudinal support structure 78 by the drive system 72. In this regard, a second motive system 82 powers the longitudinal carriage 80 through the drive train 76. A high-speed water jet nozzle 84 is mounted on the longitudinal carriage 80 to move therewith as the nozzle operates on (cuts) the underlying workpiece WP being carried by the conveyor 22.

As shown in FIG. 8, the transverse support structure 68 includes a beam structure 86 that extends transversely across the conveyor 22 at an elevation spaced above belt 60. The ends of the beam structure 86 are supported by brackets 88 and 90 extending upwardly from the conveyor's support structure 62. The support structure 62 also includes a track for guiding the carriage 70 along beam structure 86, composed of an upper rail 92 and a lower rail 94 attached to face of beam structure 86 facing the carriage. The carriage 70 includes a generally rectangularly shaped bed portion 96 with rollers 98 attached to the corners of the bed portion.

The carriage 70 is powered to move back and forth along beam structure 86 by motive system 74. In this regard, a timing belt 100 extends around a drive pulley 102 located at the upper end of motive system 74, and also around an idler pulley 104 of an idler assembly 106 mounted on the upper end of bracket 88. The belt 100 makes a loop around beam structure 86, extending closely along the side walls of the beam, with the ends of the belt connected to the back side of carriage bed 96.

The motive system 74 includes the servo motor 108 controllable by computer 42 to move the carriage 70 back and forth along beam structure 86 as desired. A drive shaft 110 extends up from the servo motor 108 to power the drive pulley 102. As further shown in FIG. 8, the longitudinal support structure 78 cantilevers transversely from carriage 70 to be carried by the carriage. The support structure 78 includes a beam member 112 that tapers in the direction of its distal end. An elongate track 114 extends along the side of the beam member 112 for guiding the longitudinal carriage 80. The carriage 80 includes a substantially planar, rectangularly shaped bed portion 116 and rollers 118 at each of its corners adapted to ride along the upper and lower edges of track 114.

Carriage 80 is moved back and forth along track 114 by drive system 72. In this regard, the drive system includes a second motive system 82, constructed similarly to motive system 74, to power a timing belt 120 which is trained around a drive pulley 122 mounted on the upper end of motive system 82 and also trained around an idler pulley 124, which is located below idler pulley 104. The belt 120 also trains around idler pulleys 126 and 128 mounted on carriage 70. A further idler pulley 130 is mounted on the distal end of beam 112. The ends of the belt 120 are attached to the bed 116 of carriage 80 so that rotation of the drive pulley 122 results in movement of the belt 120 which in turn causes transverse carriage 80 to move along track 114. As with motive system 74, ideally, motive system 82 includes a servo motor 132, which is drivingly engaged with drive pulley 122 by a drive shaft 133.

A cutting tool in the form of a high-pressure liquid nozzle assembly 84 is mounted on the longitudinal carriage 80 to move therewith. The nozzle assembly includes a body portion 134 that is secured to the carriage bed 116. The nozzle assembly 84 also includes a lower outlet tip 136 directed downwardly towards conveyor belt 60. An entrance elbow 138 is attached to the upper end of the nozzle body 134. High-pressure liquid nozzles of the type of nozzle assembly 84 are articles of commerce. High-pressure water is supplied to nozzle assembly 84 by supply lines, not shown, in a manner well-known in the art.

In operation, as workpieces WP are carried along conveyor 22, the nozzle assembly 84 is moved along selected paths of travel by carriages 70 and 80 powered by drive system 72. Carriage 70 moves the nozzle 84 transversely, and carriage 80 moves the nozzle longitudinally relative to the direction of travel of the conveyor 22. This enables the nozzle to travel quickly along complicated routes which are programmed into the operation of the servo motors of the motive systems 74 and 82 by computer 42.

As most clearly illustrated in FIGS. 3A, 3B, 3C, 3D, and 3E, off load station 26 includes a plurality of pickup devices 28 for removing selective portioned workpieces PP from conveyor 22 and depositing such portioned workpieces onto take-away conveyors 30. The off load station 26 includes an overhead framed structure 150 that spans between the adjacent end of the portioning station cabinet 152 and a frame end structure 154, which also supports the adjacent end of the conveyor 22. The overhead frame includes a plurality of side-by-side cabinets 156, each housing a drive system 158 for associated pickup devices 28 positioned below the cabinets. Preferably, each of the cabinets is generally rectangular in shape and has a front access door 160. Three side-by-side cabinets 156 are illustrated, with the cabinets attached to each other to create a rigid, unitary beam structure. The drive system 158 includes, among other components, a servo motor 162 schematically shown in FIG. 3D as positioned above a servo motor cooling fan 164, which in turn is positioned on a mounting platform 166 spaced above cabinet floor 168 by a plurality of support legs 170. A coupling 172 is attached to the output shaft (not shown) of the servo motor and also attached to the upper end of a drive shaft 174 that extends through an opening formed in cabinet floor 168. As most clearly shown in FIGS. 3C and 3D, a drive pulley 176 is coupled to the lower end of the drive shaft 174.

The pickup devices 28 are carried by carriages 180 that ride along frame assemblies 182 that in turn are attached to the underside of cabinets 156 by a mounting bar 186 attached to and extending along the underside of the cabinet floor 168 in a direction generally transversely to the direction of travel of conveyor 22. The mounting bar 186 projects from a generally rectangularly shaped mounting flange 188, also attached to the underside of the cabinet floor 168. A drive shaft hub 190 projects downwardly from a clearance hole formed in the mounting flange 188 for receiving the drive shaft 174 therethrough. Preferably, roller or other types of bearings are positioned within the upper and lower end portions of the hub 190 for positioning and supporting the drive shaft 174.

The carriage frame assemblies 182 each include a longitudinal beam 192 attached to the underside of an edge flange 194 projecting upwardly from the beam along a portion thereof that is positioned below a corresponding cabinet 156. Longitudinal slots 196 are formed in the edge flange 194 through which extend hardware members, for instance, bolts that engage within threaded cross-holes extending through mounting bar 186. In this manner, the frame assembly 182 may be longitudinally adjusted relative to the mounting bar 186, as will be discussed more fully below. Spaced-apart upper and lower rod tracks 200 and 202 are mounted to beam 192 at the ends of the rod tracks by end flange plates 204 and 206, which are attached to the ends of the beam 192. A pair of rod tracks 200 and 202 are located on each side of the beam 192. An idler pulley 208 is spaced outwardly from flange plate 206 on an upright support shaft 210, which in turn is attached to upper and lower mounting ears 212 projecting from the upper and lower portions of flange plate 206. An endless cog or gear belt 214 (FIG. 3G) spans between the drive pulley 176 and the idler pulley 208.

The tension on belt 214 may be adjusted by shifting the position of beam 192 and, thus idler pulley 208, relative to the drive pulley 176 so that moving the idler pulley away from the drive pulley will increase a tension on the belt 214, while shifting the idler pulley toward the drive pulley will reduce the tension on the belt. The movement of the beam 192 is accomplished through the use of a threaded stud 216 that projects outwardly from the end of mounting bar 186 through a clearance opening formed in a take-up tab 218 projecting upwardly from the upper surface of beam 192 at a position spaced a short distance from the end of the mounting bar. Hardware members in the form of nuts 220 are threadably engaged over stud 216 to bear against the opposite sides of the tab 218 thereby to position the tab relative to the end of the mounting bar 186. Once the desired tension of the belt 214 is achieved, the nuts 220 capture the tab 218 therebetween.

Next, referring specifically to FIGS. 3D, 3E, 3F, 3G, 4A, 4B, 4C, and 4F, the pickup devices 28 include carriages 180 carried by frame assemblies 182. The carriages 180 each include a slider block 230 secured to the four corner portions of a planar, substantially rectangular carriage plate 232. The slider blocks include clearance holes for receiving rod tracks 200, 202. Ideally, a bushing 233, or other anti-friction device, is pressed or otherwise securely positioned within the clearance hole of the slider block to help the carriage anti-frictionally slide along the frame assemblies 182.

The carriage 180 is secured to the backside of carriage plate 232 by a clamping plate 233A, which presses the belt 214 against a clamping block 233B, secured to the back surface of the carriage plate 232 as best shown in FIG. 4B. The surface of the clamping plate 233A facing the belt may be grooved to match the contour of the belt teeth so as to securely retain the belt between the plate 233A and the block 233B. Hardware members extend through clearance holes formed in the plate 233A above and below the belt, to extend within aligned threaded holes formed in the block 233B. In this manner, the belt 214 is securely attached to the pickup carriage 180 without having to drill holes or otherwise alter the belt 214.

Each of the pickup devices 28 includes a linear actuator in the form of a pneumatic cylinder assembly 234, which is secured to and carried by carriage 180. The cylinder portion 236 of each cylinder assembly is held in place on carriage 180 by a lower attachment block 238 which is mounted on the carriage plate 232 by hardware members 240. A close-fitting clearance hole is vertically formed in attachment block 238 to slidably receive cylinder portion 236 therein. The lower end of the cylinder portion 236 abuts the upper surface of an end block 244, which has a narrow slot formed therein to provide clearance for the cylinder rod 246 which projects downwardly from the cylinder portion 236. The upper end of the cylinder portion 236 is securely held in place by a quick release clamp assembly 248 composed of a stationary half 250 and a pivotal half 252 hinged to the stationary half by a pin 254. The stationary half 250 and pivot half 252 of the clamp assembly 248 are shaped to define a circular receiving seat 256 for securely clamping against the upper end portion of the cylinder 236. The pivot half 252 is held in closed position by a spring-loaded pivot pin 258 that extends outwardly through clearance slots provided in the adjacent portions of clamp stationary half 250 and clamp pivot half 252 to extend through a clearance hole formed in a transverse pin 259. A compression spring 259A is engaged over the free end portion of pin 258 to press against transverse pin 259 so as to help retain the transverse pin engaged within a semicircular seat 257 formed in the pivot half 252.

Referring specifically to FIGS. 4A–4C and 4F, a suction tip or head 260 is attached to the lower end of rod 246 for adherence to the portioned workpiece PP being removed from conveyor 22. A compressible bellows cup assembly 261 is attached over an extension neck 261A projecting downwardly from the main body portion of tip 260. The bottom 261B of the bellows assembly is cup-shaped so as to achieve a secure attachment with the portioned workpieces PP to be picked up. A center bore or passage 261C extends through the tip 260 and extension neck 261A to present an opening 261D at the bottom of the extension neck.

In certain situations, it may be important to keep the suction tip 260 from rotating thereby to maintain the orientation of the portioned workpiece. This is accomplished by use of a guide rod 262 having its lower end fixed to a tab 264 projecting outwardly from the generally cylindrically-shaped suction tip 260. The upper end portion of the rod 262 slides within a vertical clearance hole formed in the attachment block 238. In this manner, guide rod 262 is disposed in a space parallel relationship with cylinder rod 246. Other systems can be utilized to prevent the suction tip 260 from rotating.

Suction is applied to the suction tip 260 by use of a venturi assembly 270 mounted on the carriage 180. Pressurized air is supplied to the venturi assembly 270 by supply line 272. The venturi creates a source of reduced air pressure which is transmitted to suction tip 260 by line 274 that is connected to a side port 276 formed in the body of suction tip 260. This side port is in fluid flow communication with the central air passageway 261C extending longitudinally upwardly from the bottom of the suction tip to the elevation of the side port. Ideally, an air valve (not shown) is used to supply pressurized air to the venturi 270 to generate a reduced pressure air source when desiring to pick up a portioned workpiece, while also supplying pressurized air to a second side port 278 of the suction tip 260 when desiring to break the suction connection between the cup assembly 261 and the workpiece, thereby to disengage the suction tip from the portioned workpiece. The side port 278 is also connected in fluid flow communication with the tip air passageway 261C. The positive pressure air source can also be used to "backblow" the suction tip 260 to clean out the suction tip or remove matter that may have become lodged therein. During this backblow operation, the air valve discontinues air flow to the venturi assembly 270 so as to not induce the matter to enter suction line 274.

The pickup device 28 is described above as utilizing suction action to grasp the portioned workpieces PP. However, other types of methods may be employed to pick up the portioned workpieces. For example, if the workpiece is composed of magnetically conductive material, the pickup device may utilize a magnet. In addition, the pickup device may consist of a clamp or jaw structure capable of physically grasping the workpiece for lifting off the conveyor 22 and then releasing the workpiece at a desired remote location from the conveyor. Alternatively, the pickup device may include forks or tines in place of the suction tip/head 260 to spear the portioned workpiece PP. As a further alternative, the pickup device may consist of very cold (below freezing temperature) tabs that "stick" to the workpiece thereby to pick up the workpiece from the conveyor 22.

Figure 4E:
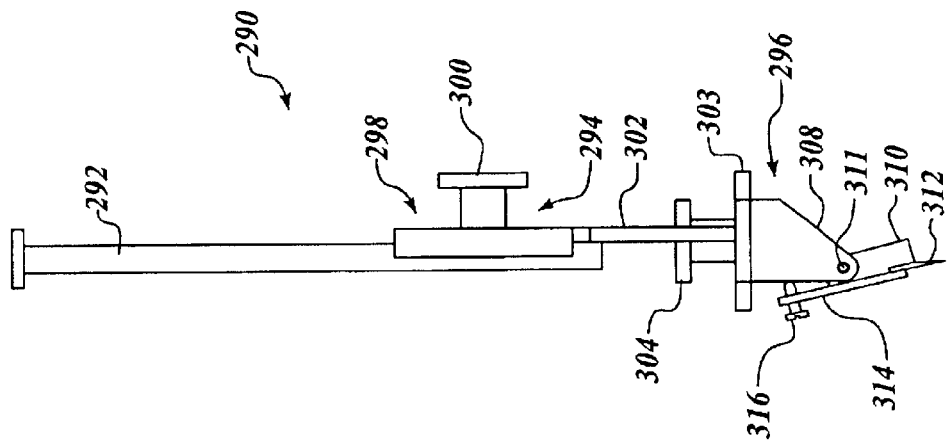
FIG. 4E is an enlarged elevational view of the hold down device shown in FIGS. 3B and 3C to hold the workpiece in place while a portion thereof is being removed using the pickup device of the present invention.
Figure 4D:
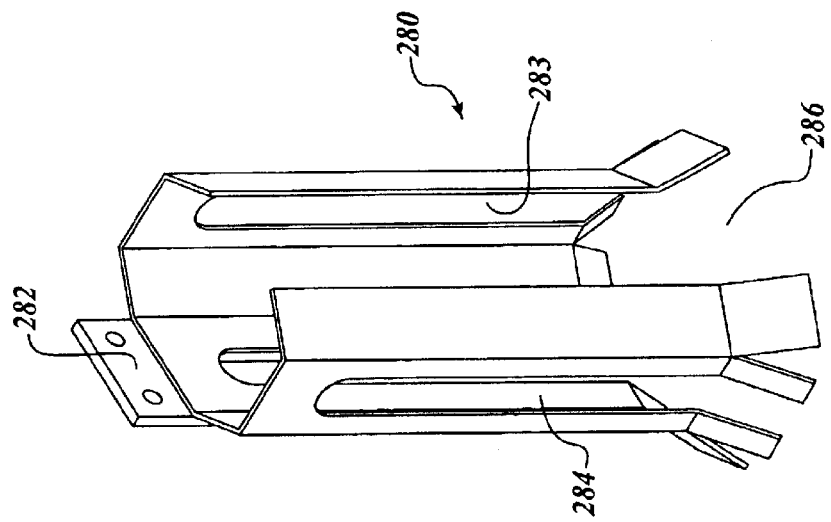
FIG. 4D is an enlarged isometric view of a skirt utilized in conjunction with the pickup device of FIGS. 4A–4C.
Figure 47:
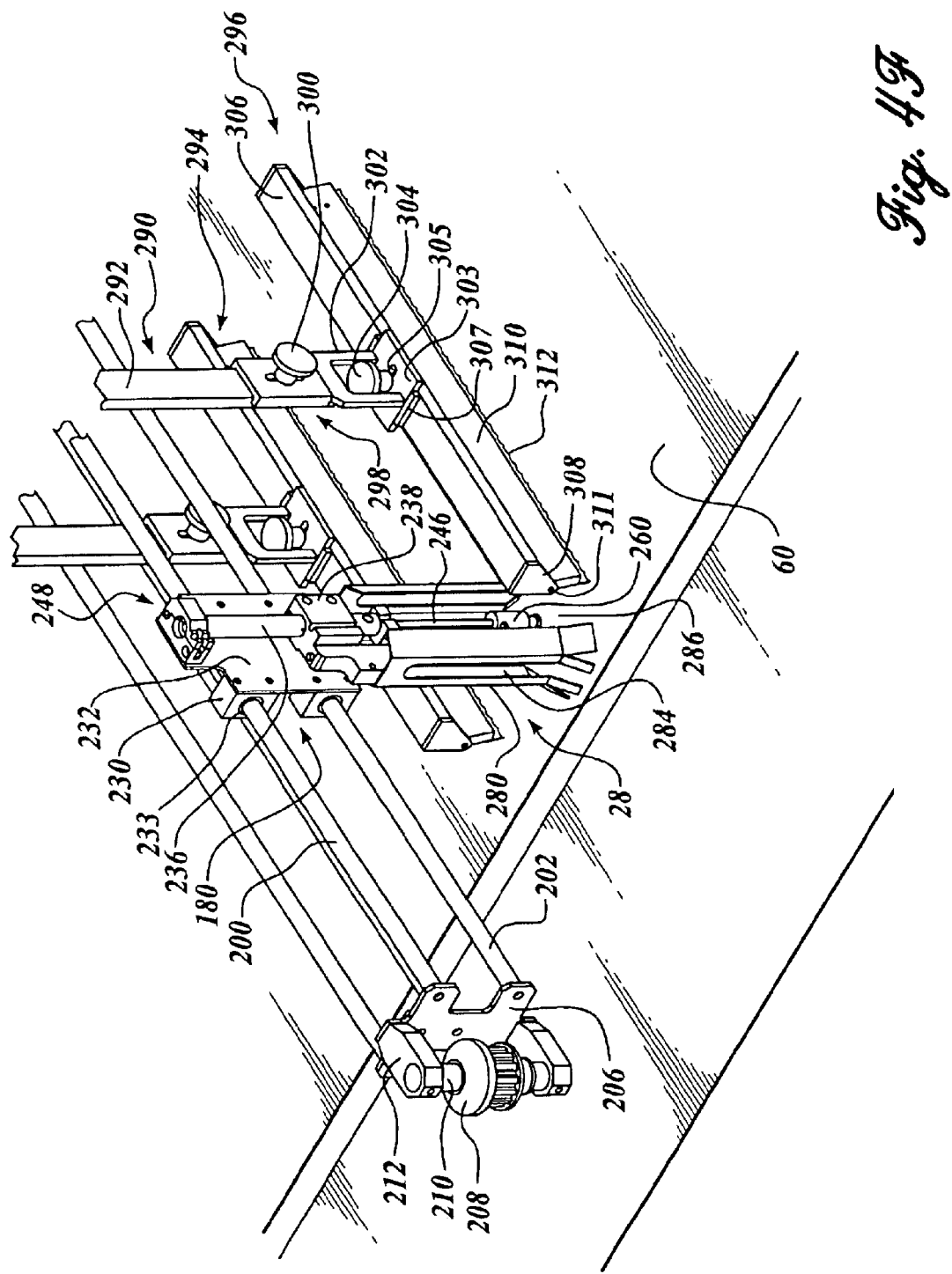

Referring specifically to FIGS. 4D and 4F, the pickup devices 28 include a retaining skirt or housing 280 designed to substantially surround the cylinder rod 246 and suction tip 260, and thereby also surround the portioned workpiece PP lifted off of the conveyor 22 by the pickup device, as described more fully below. The skirt is mounted on the carriage plate 232 by a tab 282 projecting upwardly from the skirt as shown in FIG. 4D. Hardware members, not shown, extend through clearance holes formed in the tab and aligned clearance holes formed in the plate 232 to engage nuts (not shown). The skirt is generally in the shape of an octagon, with one panel missing to define a longitudinal gap 283 in the skirt to reduce the weight of the skirt and also provide access to the cylinder assembly 234. One or more of the panels may include slot 284 formed therein so as to reduce the weight of the skirt. At the bottom of the skirt, the panels flare outwardly so as to define an enlarged entrance opening 286 for the portioned workpiece as the portioned workpiece is lifted upwardly into the skirt by retraction of the rod 246 of the cylinder assembly 234.

It will be appreciated that the skirt/housing 280 may be of configurations other than that illustrated in FIGS. 4D and 4F. In this regard, a cage structure (not shown) composed of wire elements or other structural members may be utilized in place of the skirt 280. Such cage structure would provide lateral restraint to the workpiece portion PP being carried by the pickup device. As in the skirt/housing 280, the cage can be constructed with a bottom opening through which the workpiece portion PP passes upwardly when being removed from the conveyor 22 and exits downwardly when being deposited at a location remote from the conveyor.

A plurality of hold-down assemblies 290 are utilized to retain the portioned workpiece downwardly against the conveyor belt 60 while the pickup device 28 lifts a desired portion upwardly off of the belt. This may be especially useful if the individual portions of the workpiece are not completely severed from each other at the portioning station 24. This is not uncommon if a high speed water jet is used to portion or trim a meat product, such as a chicken breast. The water jet may not always completely sever cartilage or the tough pieces of meat product.

In one preferred embodiment of the present invention, the hold down assembly 290 includes a post 292 extending downwardly from the underside of a cabinet 156. The post is illustrated in FIGS. 4E and 4F as generally rectangular in cross-sectional shape. A slider coupler assembly 294 is used to attach a hold down blade assembly 296 to the lower end portion of the post 292. The coupler assembly 294 includes a slide channel 298 having a web portion overlying one surface of the post 292 and rather narrow flange portions overlying the edges of the post so as to be slideable along the height of the post, while retaining the slide channel against movement in other directions relative to the post. A longitudinal slot is formed in the web section of the side channel 298 through which extends the stud portion of an adjustment knob 300 to engage within a threaded hole formed in post 292 thereby to securely clamp the coupler assembly 294 to the post at a desired elevation along the height of the post thereby to position the bottom of the blade assembly 296 at a desired elevation relative to conveyor belt 60.

The coupler assembly 294 includes generally U-shaped intermediate section 302 that projects downwardly from slide channel 298 to transversely interconnect with a horizontal, generally rectangular-shaped slide plate 303. The slide plate has a slot formed therein in the direction generally parallel to the direction of travel of the belt 60. The downward extended stud portion of a knob 304 extends through the slot 305 of the slide plate 303 to engage with a threaded through hole formed in the bar portion 306 of the blade assembly 296 thereby to securely clamp the slide plate 303 to the blade assembly while allowing the blade assembly to be adjusted transversely to its length, i.e., in the direction parallel to the movement of the conveyor belt 60. The slide plate 303 is held captive between guide ridges 307 extending transversely across the bar 306 and spaced apart to closely receive the slide plate 303 therebetween. It can be appreciated that the guide ridges 307 restrict any substantial transverse movement of the blade assembly 296 relative to coupler assembly 294 (lengthwise along bar 306) or rotational movement about a vertical axis corresponding to the center of knob 304.

With respect to the construction of the blade assembly 296, end tabs 308 extend downwardly from the ends of bar 306 to pivotally couple to the upper edge portion of longitudinal pivot bar 310. The end tabs 308 are generally triangular in shape, with the apex of the triangle located in the downward direction for supporting a pin 311 extending therethrough to extend into the adjacent edge portion of the pivot bar 310. A relatively thin blade 312 is attached to the lower edge portion of the pivot bar to project downwardly from the bottom edge of the bar towards the upper surface of the belt 60. As shown in FIG. 4F, in one embodiment of the present invention, the lower edge of the blade 312 is serrated. Such lower edge portion can be formed in other shapes, for example, in the form of v-shaped teeth or prongs. A stop tab 314 overlies one face of the pivot bar 310 at one end thereof and in alignment with an end tab 308. An adjustment screw 316 extends through a threaded opening formed in the stop tab 314 to bear against the adjacent edge of end tab 308. The engagement of the adjustment screw 316 with a stop tab 314 may be varied thereby to alter the nominal orientation of the pivot bar 310 and thus the blade 312.

In use, the pivot blade 312 is able to pivot about pin 311 thereby to raise the blade 312 upwardly away from the belt 60 when a workpiece WP carried by the belt passes beneath the hold down assembly 290. However, if a workpiece portion PP is being lifted upwardly by the pickup device 28, the adjacent portion of the workpiece may be retained downwardly against the conveyor belt 60 by the impingement of the blade 312 against the workpiece. When an upward force is placed on the blade 312 by the workpiece, the pivot bar 310 tends to pivot about pin 311, but is prevented from doing so by stop tab 314.

As shown in FIGS. 3A, 3B, 3C, and 4F, a plurality of hold down assemblies 290 may be utilized with each frame assembly 182. Ideally, a hold down assembly 290 is positioned in front of and behind each pickup device 28 (relative to the direction of movement of the conveyor belt) and positioned laterally with respect to the belt to coincide with the general location of the lanes along which the workpieces WP travel along the belt.

Referring specifically to FIG. 2A, portioned workpieces PP are removed from conveyor 22 by the pickup device 28 and deposited on the take-away conveyors 30 which carry the portioned workpieces to sorting conveyors 32. It will be appreciated that in conjunction with the present invention, the computer 42 is capable of retaining or keeping track of which particular portioned workpiece PP is placed on the take-away conveyors 30 as well as a location of the portioned workpieces on the conveyor 30. The computer 42 is also capable of keeping track of or retaining the locations of the portioned workpieces PP on the sorting conveyors 32. This information is used at the sorting station 35 to place the proper portioned workpiece in the proper receiving bin 34. For example, the workpiece WP may be portioned into different sizes at portioning station 24. As noted above, the sizes and locations on the conveyor 22 of the portioned workpieces PP is known, with that information the workpieces are removed from the conveyor by the pickup devices 28 and deposited onto the take-away conveyor 30 at a position on the conveyor known to the computer 42. To this end an encoder can be incorporated into the take-away conveyor in a manner that is known in the art. In turn, the conveyor 30 deposits the portioned workpiece PP on the sorting conveyor 32 at locations known to the computer 42. The sorting conveyors likewise can utilize encoders. This information is employed by the swing arms 320 that swing across the sorting conveyors 32 to place the portioned workpieces PP into selected bins 34 according to a desired parameter, such as the weight of the portioned piece.

A series of four bins 34E, F, G, and H are positioned longitudinally of the sorting conveyors 32 so that portioned workpieces PP of four different sizes or other selected physical parameter(s) may be placed within the bins. As will be appreciated, in accordance with the present invention, a fewer number or a greater number of bins 34 may be positioned lengthwise of the sorting conveyors 32. The bins being filled are illustrated in FIG. 2A as positioned between the two side-by-side sorting conveyors 32. Once full, the bins can be shifted or moved out from between the two sorting conveyors (down the page in FIG. 2A) and empty bins 34 placed in registry between the two sorting conveyors 32. The fact that a bin is full can be automatically determined in several ways, such as by incorporating a scale into the station at which the bin is located as they are being filled. Also, the number of portioned workpieces PP placed into the bin by the swing arm 320 can be counted.

The swing arms 320 can be powered by a convenient source such as electricity or pressurized fluid. Swing arms similar to swing arms 320 are articles of commerce.

Optionally, in the present invention, a weighing station 38 may be positioned along the sorting conveyors 30 or integrated into the construction of the sorting conveyor. The purpose of the weighing station 38 is to weigh the portioned pieces PP as they move along the sorting conveyors. This information can be utilized to operate and control the swing arms 320 rather than relying on the computer 42 to keep track of the positions of the portioned pieces PP on the sorting conveyors. Also, the information from the weighing stations 38 can be used to confirm the weight of the portioned pieces portioned at the portioning station 24. If the weight of the portioned workpieces is beyond an acceptable range, this information can be fed back to the portioning station 24 to adjust the manner in which the workpieces are being portioned by the portioning apparatus 66. In this manner, the calibration of the portioning apparatus 66 may be continually monitored and updated as needed. Of course, for calibration purposes, rather than utilizing weighing station 38, the portioned workpieces PP may be removed manually from the take-away conveyor 30 or sorting conveyor 32 and weighed by a machine operator. If such weighing determines that the portioned pieces are not within the desired range, the portioning apparatus 66 may then be adjusted as required.

In the use of the apparatus 20 of the present invention, workpieces WP are placed on the belt 60 of the conveyor 22 for movement along the apparatus, first passing through the scanning station 40 and through a portioning station 24 and then to an unloading station 26. The workpieces ideally are placed in multiple lanes on the conveyor so as to increase the rate at which the workpieces can be portioned and/or trimmed. FIG. 2A illustrates two separate lanes being used along the conveyor 22. At the scanning station, the workpieces are scanned to ascertain selected physical parameters, for example the overall size and shape of the workpiece. This information can be used to determine the weight of the workpiece by utilizing an assumed density for the workpiece. The scanning can be carried out by a variety of existing techniques, including video cameras that view the workpiece as illuminated by one or more light sources. As an alternative, x-rays can be used to scan the workpiece. Information from the scanning of the workpiece is used to determine how to optimally cut or trim the workpiece through the use of a computer 42. The computer can be programmed with software to analyze how to best cut the workpiece of a particular size and/or shape to produce portioned pieces of desired sizes, shapes or other physical parameters.

Information from the scanning of the workpiece is used to control cutting/portioning devices, for example high speed water jet nozzles 84 carried on a carriage 80 adapted to move back and forth along a longitudinal support structure 78 extending parallel to the direction of movement of the conveyor. The support structure is cantilevered from a second carriage 80 which is powered to move back and forth along a beam structure 86 that spans across the conveyor 22 at an elevation above the conveyor belt. In this manner, the high speed water jet nozzle 84 can quickly travel along complicated routes under the control of the computer 42 to not only portion the workpiece, but also to trim the workpiece as needed. The locations of the workpieces on the conveyor are tracked and such locations retained by the computer as the workpiece moves through the scanning station and through the portioning station and to the offload station 26.

At the offload station, pickup devices 28 remove selective portioned workpieces PP from the conveyor and deposit such portioned workpieces onto a take-away conveyor 30. The pickup devices in construction include a linear actuator in the form of a pneumatic cylinder assembly 234 having a rod 246 extendable downwardly towards the conveyor belt 60. A suction tip or head 260 is carried by the free end of the rod to securely attach to a portioned workpiece. A venturi 270 generates a suction supplied to the tip or head 260. The pickup device is carried by a carriage 180 adapted to travel along a transverse frame assembly 182 by an endless belt 214 which is powered by a servo motor 162. Once the pickup device has attached to a workpiece portion PP, the pickup device is retracted upwardly to lift the workpiece portion off the conveyor and away from the remainder of the workpiece. The carriage is activated to travel transversely relative to the conveyor to overlie a take-away conveyor 30 on which the workpiece portion is deposited.

A hold-down assembly 290 is optionally employed to hold the workpiece surrounding the portioned workpiece PP downwardly against the conveyor 22 as the pickup device is lifting the portioned workpiece upwardly. When lifted upwardly, the suction tip 260, and the portioned workpiece PP being carried thereby, enter a skirt or shroud 280 that substantially encircles the pickup device and the workpiece portion. The skirt surrounds and restrains the workpiece as the carriage 180 travels laterally from the conveyor 22 to the take-away conveyor 30. This travel occurs very quickly generating a high acceleration when beginning its lateral movement and a high deceleration rate when coming to a stop over the take-away conveyor 30. Without the skirt 280, the workpiece, especially if a food product, may tend to swing back and forth during the high acceleration and deceleration of the carriage 180.

From the take-away conveyor 30 the workpiece is routed to a sorting conveyor 32 passing through a sorting station 36. Swing arms 320 are located along the sorting conveyor to slide the portioned pieces into receiving bins 34. A weighing station 38 may be incorporated into the structure of the sorting conveyor 32 or may be separately constructed. The purpose of the weighing station is to weigh the portioned workpieces PP as they pass by thereby to make sure that the workpieces are within the desired weight range. If this is not the case, the information from the weighing station may be utilized to adjust the operation of the portioning station 24. Thus, a feedback loop is created so that the cutters used at the portioning station 24, e.g., high speed water jet nozzles 84, are adjusted as necessary to help ensure that the workpieces are uniformly portioned to the desired sizes. Moreover, this information can be used to recognize if the pickup devices 28 are not operating properly, for instance if they become plugged so that they are not capable of lifting the portioned workpieces off of the conveyor 22, in which case no workpieces would be passing over the weighing station 38.

It will be appreciated that through the present invention it is possible to continuously and quickly portion workpieces, such as meat products, into desired sizes and also to trim the workpieces, for instance, to remove fat, bone or other undesirable content from a meat product. Through the present invention, the portioned workpieces PP are sorted into sizes or by other parameters and placed in bins 34 or other receptacles. The computer 42 is capable of keeping track of the sizes and other physical parameters of the portioned workpiece as well as the location of such portioned workpiece on the main conveyor 22, the take-away conveyors 30, and the sorting conveyors 32. Thus, it is not necessary for personnel to physically remove the portioned pieces from the conveyor 22 and place the portioned pieces onto a take-away conveyor, such as conveyor 30 or to place the portioned workpieces into receptacles such as bins 34. It is often difficult for a worker to differentiate among portioned pieces that may differ in size by only an ounce or two. However, the present invention is capable of quickly, accurately, and repeatedly making this distinction among workpieces, or other distinctions by which workpieces are graded and/or sorted. Moreover, meat products are portioned in environments wherein the room temperature is typically at about 40 degrees, which quite cold, and very difficult for personnel to withstand on a daily basis. Whereas the portioning apparatus 20 of the present invention is substantially immune to such cold temperatures.

FIGS. 5, 6A–6E, and 7 illustrate alternative embodiments of pickup devices in accordance with the present invention. The pickup device 360, shown in FIG. 5, includes a linear actuator 362, which is illustrated in the form of a fluid cylinder, but can be other configurations, such as in the form of an electrical actuator. The cylinder assembly 362 includes a cylinder portion 364 having its upper end secured to an angled mount 366, which in turn may be secured to cabinets 156 of the overhead frame structure 150. The rod portion 368 of the cylinder assembly 362 is secured to an intermediate flange 370 projecting laterally from longitudinal follower bracket 372. The upper end of the follower bracket includes a collar portion 374 that closely encircles the cylinder 364. As the rod 368 extends and retracts, the follower bracket 372 is lowered and raised causing the collar portion 374 to slide along the length of the cylinder portion. A camming groove 376 is formed in the exterior of the cylinder 364, with the groove twisting approximately 90 degrees from its upper end to its lower end. A follower pin 378 projects inwardly from the bracket 372 at an elevation corresponding to collar portion 374 to extend into the groove 376. It will be appreciated that as rod 368 is extended the follower bracket 372 is moved downwardly and simultaneously rotated about the longitudinal axis of the cylinder assembly 362. Correspondingly, when the rod 368 is retracted, the follower bracket 372 is raised upwardly and simultaneously rotated in the reverse direction due to the follower pin 378 riding within groove 376.

The follower bracket 372 includes a lower flange portion 380 having a center bore formed therein for receiving the upper portion of slide rod 382. Ideally, a bushing is disposed between the slide rod 382 and the center bore of the flange 380. A suction tip or head 384 is secured to the lower end of the slide rod 382, which tip/head is in fluid flow communication with a venturi 386 attached to and interconnected in fluid flow communication with the suction tip 384 by a nipple 388. The venturi 386 is similar to venturi 270, discussed above and is capable of generating a reduced pressure supply for the suction tip 384. A bellows-type pickup cup 390 is secured to the lower end suction tip 384 for physically interfacing with portioned workpieces PP.

A compression spring 392 encircles the slide rod between the suction tip 384 and the bottom side of the flange 380 thereby to nominally retain the slide rod extended transversely relative to the follower bracket 372 while allowing the slide rod to retract upwardly relative to the follower bracket 372, for instance, when the follower bracket is being lowered and the pickup cup 390 makes contact against the upper side of the portioned workpiece. A retaining nut 394 is positioned on the upper end of the slide rod 382 to prevent the slide rod from downwardly disengaging from the flange 380. A vertical groove 396 is formed lengthwise in the exterior of the slide rod 382 and is sized to closely receive the end portion of a transverse pin 398 spanning across the inside diameter of flange 380 so as to keep the slide rod from rotating relative to the follower bracket 372.

Next, referring to FIG. 6A, a pickup device 400 includes linear actuator similar to that shown in FIG. 5 having a threaded extension 401 projecting from the end of rod 402. The extension 401 is bolted to an attachment bracket 404 with nuts 406. Bracket 404 includes a reduced thickness flange portion 408 having the clearance hole formed therein for receiving a hub 409 therein. A hollow slide rod 410 is sized to be closely slidably receivable within the hub 409. In a manner similar to a slide rod 382, the slide rod 410 is adapted to retract upwardly relative to flange 408 when pushed upwardly from the bottom, but is urged in nominal downward position by an extension spring 412 that encircles the slide rod and bears against a washer 414 positioned beneath hub 409. A T-connector 422 is attached to the lower end of the hollow slide rod 410, which T-connector includes an inlet nipple 424 connected to a source of pressurized air through line 426. A bellows-type pickup cup 428 is attached to the lower end of the T-connector 422 by a nipple 430. A threaded nipple fitting 432 is attached to the upper end of the slide rod 410 through the use of a collar 434. A line 436 supplies a partial vacuum to the hollow slide rod 410 and suction cup 428 from a vacuum source (not shown), for instance a venturi similar to venturi 386 in FIG. 5.

As also illustrated in FIG. 6A, a horizontal hold down foot 440 is attached to the lower end of a slide rod 442. The upper portion of the slide rod slidably engages through a close fitting clearance hole formed in bracket 404. A cap 444 is secured to the upper end of the slide rod to prevent the slide rod from sliding downwardly out of engagement with the bracket 404. In a manner similar to compression spring 412, a compression spring 446 nominally draws the slide rod 442 to a downward position, shown in FIG. 6A. The upper end of the compression spring bears against a washer 448 positioned beneath the bracket 404, while the lower end of the spring bears against the upper surface of a stop collar 450. A set screw 452 engages through a threaded hole extending through collar 450 to lock against the outer surface of the slide rod 442.

In operation when the rod 402 is lowered far enough, the hold down foot 440 bears against the workpiece. The slide rod is capable of retracting upwardly relative to bracket 404, as the rod 402 is further lowered so as to impart a maximum load in the workpiece even as the rod 402 is further lowered. As the rod is lowered further, the pickup cup 428 engages the workpiece portion to be lifted up through the vacuum action applied to the suction cup through hose 436 attached to the upper end of the hollow slide rod 410. Thereafter, as the rod 402 is retracted upwardly to lift the workpiece portion attached to cup 428, the hold down foot 440 retains pressure against the upper side of the workpiece surrounding the workpiece portion PP to be carried away. In this manner, the hold down foot assists in making sure that the portioned workpiece being lifted away is cleanly detached from the remainder of the workpiece.

In top view, the foot may be C-shaped, D-shaped, loop-shaped, circular or of other shape to suit the shape of the workpiece being cut. In addition, as shown in FIGS. 6C and 6D, the foot may have a sharpened downwardly extending edge to also cut the workpiece surrounding the portion to be lifted away. In plan view, the cutter type feet may be shaped to correspond with the circumference of the workpiece to be carried away. In this manner, the cutter foot helps to further cut the workpiece to be carried away from the remainder of the workpiece, if a clean cut has not occurred previously.

FIG. 6E illustrates a pickup device 460 which is similar in construction to pickup device 400, but utilizing a different hold down system 462. The components in FIG. 6E that correspond to the components of FIG. 6A are identified with the same part number, but with the addition of a prime symbol. For expediency the construction and function of these components will not be repeated here.

The hold down assembly 462 includes an elongated roller 464 axled to the lower end of a trailing pivot rod 466. The upper end portion of the pivot rod is pinned to the lower end of a bracket 468 to pivot about axis 469. The bracket 468 depends downwardly from the underside of a flat mounting plate 470 attachable to the underside of a cabinet 156 (not shown). A torsion spring 472 is positioned relative to axis 469 to impart a downward force on the lower end of the pivot rod 466. A stop screw 474 engages through a threaded crosshole formed in the upper end portion of the pivot rod to bear against the under surface of mounting plate 470 to nominally position the roller 464 relative to conveyor belt 60.

It will be appreciated that the roller 464 imparts a downward retaining force on the workpiece adjacent to the workpiece portion PP that is being lifted away by the pickup device 460. To this end, the roller 464 may have a serrated outer perimeter to provide better traction against the workpiece. The roller 464 ideally is of sufficient length to span across the width of the workpiece as shown in FIG. 6E.

The pickup device 480 shown in FIG. 7 also includes a linear actuator having a downwardly extendable rod 482 attached to the upper end of a hollow tube 484 which has an outside diameter to closely and slidably engage through a slide hub 486. A stop washer 487 is attached to the lower end of tube 484 and has an outer diameter that underlies a bottom edge of the slide hub 486 to prevent the slide tube from slidably disengaging in the downward direction from the hub 486. A compression spring 488 bears against a stop cap 490 fixed to the upper end of the tube 484. The cap 490 has a central clearance hole for receiving the lower threaded tip portion 492 of the rod 482 therein, thereby to attach the rod to the tube 484. The lower end of the compression spring 488 bears against the upper end of the slide hub 486 to nominally push the slide hub downwardly against the stop washer 487. The upper end portion of a generally U-shaped yoke 494 is attached to the exterior of the slide hub 486 at diametrically opposed locations on the slide hub, and a hold-down foot 496 is attached to the lower end of the yoke 494. The hold down foot 496 functions in a manner similar to the hold down foot 440 shown in FIG. 6A.

A slide tube 498 engages closely within a hollow slide hammer 500 fixedly attached to a cross member 502 fixed within tube 484. The slide hammer 500 carries and positions the slide tube 498 while allowing the slide tube to slide within the slide hammer. An end cap 504 closes off the upper end of the slide tube 498 and also is sized to prevent the tube 498 from downwardly detaching from the slide hammer 500. A compression spring 506 nominally positions the slide tube 498 downwardly relative to the slide hammer 500. The upper end of the compression spring bears against the underside of the slide hammer 500, while the lower end of the spring 506 bears against a tube cross fitting 508 attached to the lower end of the slide tube 498. One or more vacuum generators or venturis 510 and 512 are connected in fluid flow communication with the fitting 508. A bellows cup 514 is attached in fluid flow communication beneath the fitting 508 by a nipple 516 in a manner similar to the pickup devices described above.

The pickup device 480 shown in FIG. 7 operates in a manner similar to the pickup devices described above, with the hold down foot 496 bearing against the workpiece around the perimeter of the portion workpiece PP to be lifted upwardly. In this regard, when the actuator rod 482 is extended downwardly, the hold down foot 496 bears against the workpiece with the applied load determined by the size or other parameters of compression spring 488. As the rod 482 continues to extend downwardly to engage the bellows cup 514 with the workpiece PP portion to be lifted up, the slide hub 486 slides relative to the tube 484. Thereafter, when the rod 482 is being retracted upwardly to lift the workpiece portion off of the conveyor, the hold down foot 496 retains pressure against the upper side of the surrounding workpiece thereby to assist in detaching the workpiece portion from the surrounding workpiece if needed, for example if the workpiece portion is not cleanly cut from the remainder of the workpiece.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for portioning workpieces to desired reduced sizes, comprising:
   (a) a first conveyor adapted to support and advance a workpiece to be portioned;
   (b) a portioning subsystem positioned proximate the first conveyor and comprising a cutter to portion a workpiece into one or more desired reduced size portions;
   (c) a pickup device positioned proximate the first conveyor and comprising an attachment portion attachable to a portioned workpiece, the pickup device moveable relative to the first conveyor to carry a portioned workpiece to a location remote from the first conveyor; and
   (d) a control subsystem tracking a location on the first conveyor of a workpiece portion portioned into the desired size by the portioning subsystem and directing the pickup device to selectively pick up a desired workpiece portion portioned into the desired reduced size and carry such a workpiece portion to a specified location remote from the first conveyor,
   wherein the control subsystem controls the operation of the cutter to portion a workpiece into one or more reduced size portions, tracks the location on the first conveyor of each of the one or more reduced size portions portioned by the cutter, and further controls the operation of the pickup device to automatically remove the one or more reduced size portions to different remote locations depending on the size of a portion.

2. A portioning system of claim 1, wherein the portioning subsystem ascertains a shape of the workpiece to be portioned and determines how to cut the workpiece into desired reduced size portions.

3. A portioning system according to claim 2, wherein the cutter of the portioning subsystem utilizes a high speed water jet.

4. A portioning system of claim 3, wherein the control subsystem controls an operation of the high speed water jet.

5. A portioning system according to claim 1, wherein the cutter of the portioning subsystem is selected from the group consisting of a high speed water jet, laser, rotary saw, hack saw, guillotine, and band saw.

* * * * *